(12) United States Patent
Sanders et al.

(10) Patent No.: US 12,022,780 B2
(45) Date of Patent: Jul. 2, 2024

(54) CONDITION BASED MONITORING OF IRRIGATION

(71) Applicant: Heartland Ag Tech, Inc., Hancock, WI (US)

(72) Inventors: Russell Sanders, Minnetonka, MN (US); Jeremie Pavelski, Wisconsin Rapids, WI (US); Robert Buchburger, Plainfield, WI (US)

(73) Assignee: HEARTLAND AG TECH, INC., Hancock, WI (US)

( * ) Notice: Subject to any disclaimer, the term of this patent is extended or adjusted under 35 U.S.C. 154(b) by 0 days.

(21) Appl. No.: 17/720,622

(22) Filed: Apr. 14, 2022

(65) Prior Publication Data
US 2022/0232783 A1     Jul. 28, 2022

Related U.S. Application Data

(63) Continuation of application No. 17/559,486, filed on Dec. 22, 2021, now Pat. No. 11,317,572.
(Continued)

(51) Int. Cl.
*A01G 25/16* (2006.01)
*G05B 15/02* (2006.01)
*G05B 19/042* (2006.01)

(52) U.S. Cl.
CPC ............ *A01G 25/16* (2013.01); *G05B 15/02* (2013.01); *G05B 19/042* (2013.01); *G05B 2219/2625* (2013.01)

(58) Field of Classification Search
CPC ...... A01G 25/16; A01G 25/092; G05B 15/02; G05B 19/042; G05B 2219/2625
See application file for complete search history.

(56) References Cited

U.S. PATENT DOCUMENTS 9,874,489 B1    1/2018  Jerphagnon et al.
10,124,358 B1 *  11/2018 Graham ................. B05B 12/12
(Continued)

FOREIGN PATENT DOCUMENTS

BR    102015005733 A2    10/2016
BR    112014003967 B1     2/2019
(Continued)

OTHER PUBLICATIONS

International Search Report and Written Opinion issued by the European Patent Office in connection with International Application No. PCT/US2021/064900 dated Apr. 8, 2022.
(Continued)

*Primary Examiner* — Chad G Erdman
(74) *Attorney, Agent, or Firm* — Carter, DeLuca & Farrell LLP

(57) ABSTRACT

A monitoring system for an irrigation system is presented. The irrigation system includes a movable end gun operatively associated with a portion of the irrigation system. The monitoring system includes a sensor configured to generate an electrical signal indicative of movement and/or positioning of the movable end gun relative to the portion of the irrigation system over time, a processor, and a memory. The memory includes instructions stored thereon, which when executed by the processor cause the system to: receive the generated electrical signal, determine whether the movable end gun, or one or more components thereof, requires maintenance based on the electrical signal, and determine when the movable end gun is in an on and/or off trigger state based on the electrical signal.

22 Claims, 25 Drawing Sheets

Related U.S. Application Data

(60) Provisional application No. 63/129,799, filed on Dec. 23, 2020.

(56) References Cited

U.S. PATENT DOCUMENTS

| | | | |
|---|---|---|---|
| 2013/0008977 A1 | 1/2013 | Pfrenger et al. | |
| 2013/0041537 A1 | 2/2013 | Malsam et al. | |
| 2014/0110498 A1 | 4/2014 | Nelson et al. | |
| 2016/0267203 A1* | 9/2016 | Christensen | G06F 30/13 |
| 2017/0349060 A1 | 12/2017 | Abts et al. | |
| 2018/0348714 A1* | 12/2018 | Larue | G05B 13/041 |
| 2019/0150357 A1* | 5/2019 | Wu | H04N 7/188 |
| 2020/0023395 A1 | 1/2020 | Tangen et al. | |
| 2020/0103894 A1 | 4/2020 | Cella et al. | |
| 2020/0329652 A1* | 10/2020 | McElhaney | G06T 7/0012 |
| 2020/0331016 A1 | 10/2020 | Akin et al. | |
| 2022/0030783 A1* | 2/2022 | Moeller | A01G 25/167 |

FOREIGN PATENT DOCUMENTS

| | | | | |
|---|---|---|---|---|
| BR | 112019016644 A2 * | 3/2020 | | A01M 7/0042 |
| CN | 103929946 A | 7/2014 | | |
| CN | 104412889 A | 3/2015 | | |
| CN | 110708948 A | 1/2020 | | |
| WO | 2013023025 A1 | 2/2013 | | |

OTHER PUBLICATIONS

Australian Examination Report issued by the Australian Government in connection with International Application No. 2021410745, dated Jun. 28, 2023.

Canadian Examination Report issued by the Canadian Patent Office in connection with International Application No. 3,204,334, dated Jul. 14, 2023.

Brazilian Office Action for Application No. 11 2023 012243-0 dated Dec. 7, 2023 with English translation, 17 pages.

Chinese Office Action for Application No. 202180087444.1 dated Feb. 2, 2024 with English translation, 25 pages.

* cited by examiner

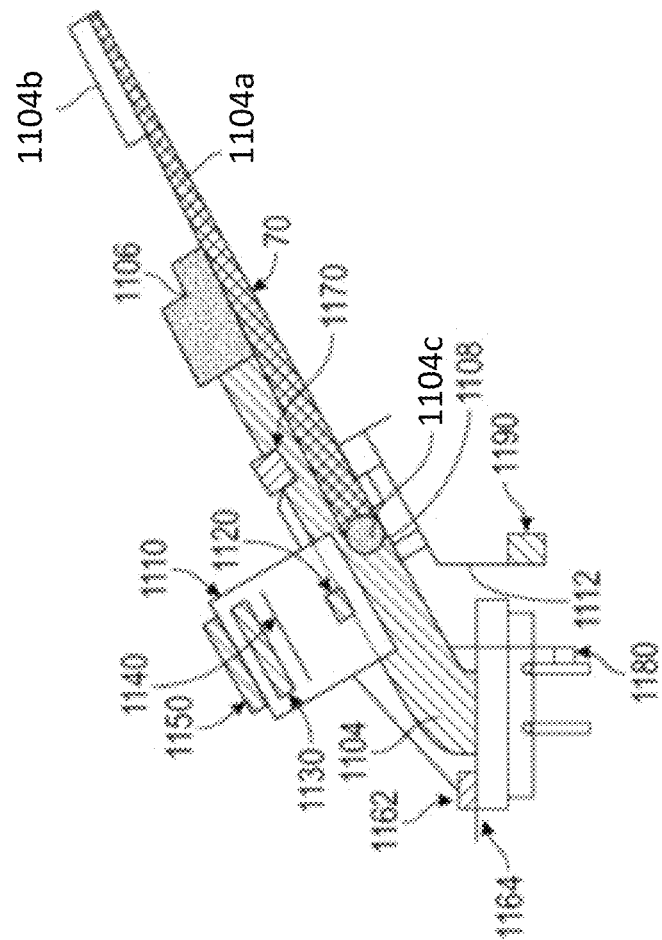
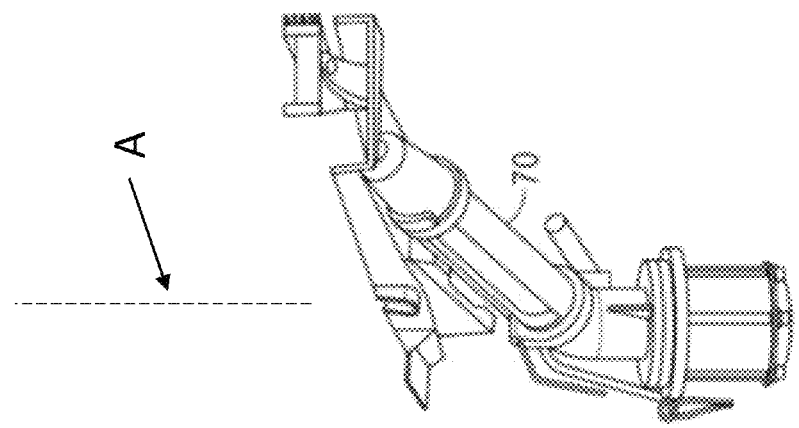
FIG. 11B
FIG. 11A

Example Signals
Accel

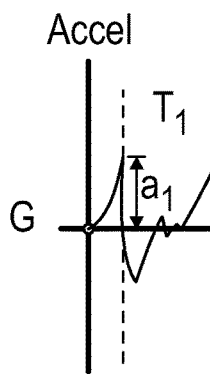

$T_c$ = Total Pass Period
$T_1$ = Forward Impact Period
$T_2$ = Reverse Impact Period
n = Number of Forward Impacts
m = Number of Reverse Impacts
$a_1$ = Gpeak Forward
$a_2$ = Gpeak Reverse One pass left to right
logic could be based on sliding window over seconds,
and/or minutes, and/or hours, and/or days/years etc...

FIG. 12A

Gyro

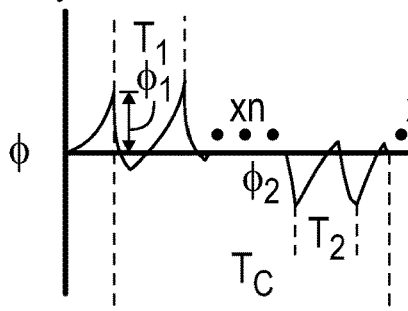

$T_c$ = Total Pass Period
$T_1$ = Forward Angular Rate
$T_2$ = Reverse Angular rate n = Number of Forward Turns
m = Number of Reverse Turns
$\phi_1$ = Forward Angular Rate
$\phi_2$ = Reverse Angular Rate

FIG. 12B

Magnetometer or Encoder    Discontinuity
                           = Gnomely

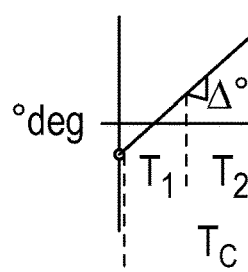

$\Delta°_1$ = Slope of Angle Change F
$\Delta°_2$ = Slope of Angle Change R

Note angular change is a direct
measurement of primary function

FIG. 12C

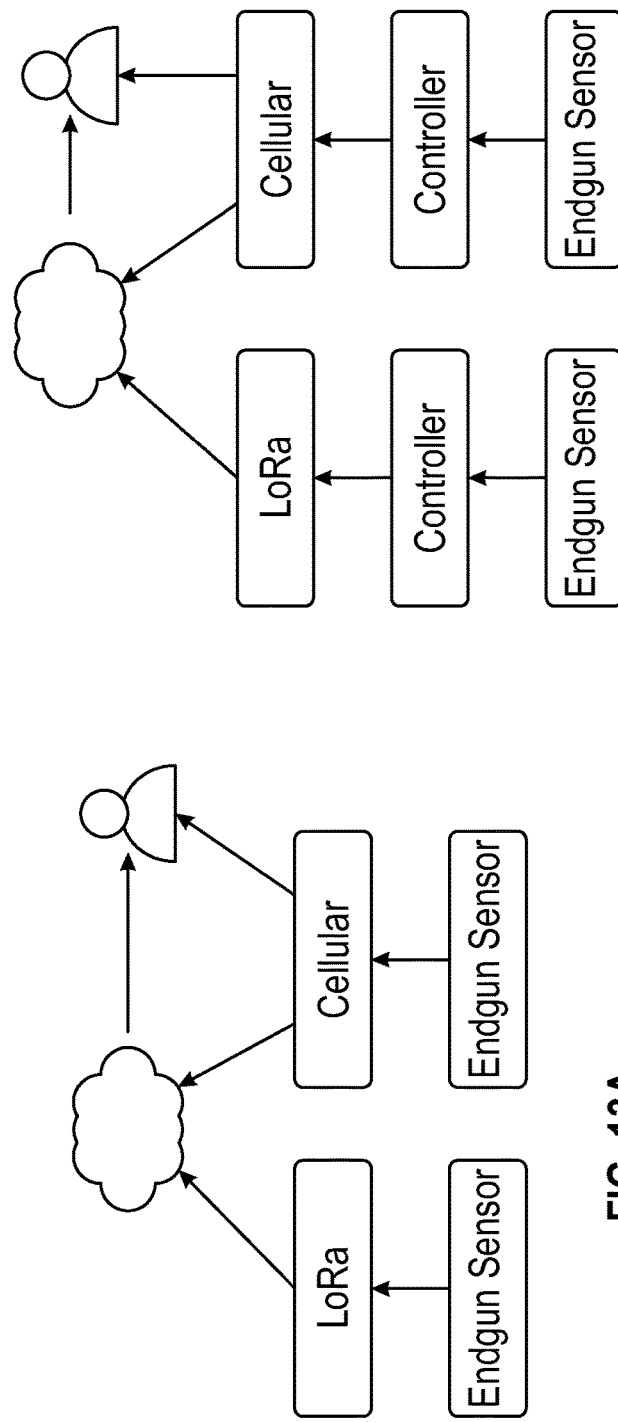
FIG. 13B
FIG. 13A
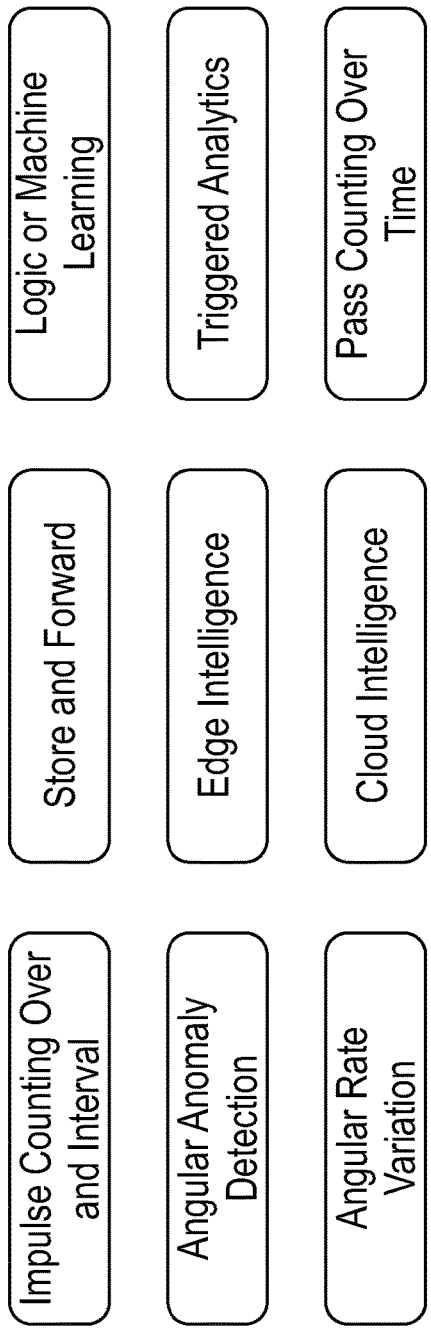
FIG. 14

CONDITION BASED MONITORING OF IRRIGATION

CROSS-REFERENCE TO RELATED APPLICATIONS

The present application is a continuation of U.S. patent application Ser. No. 17/559,486, filed on Dec. 22, 2021, which claims the benefit of U.S. Provisional Patent Application No. 63/129,799, filed on Dec. 23, 2020, the entire contents of which are hereby incorporated herein by reference.

TECHNICAL FIELD

This disclosure relates to irrigation systems and, more particularly, to structures and methods for effectuating predictive maintenance of irrigation systems.

BACKGROUND

Irrigation systems such as pivots, lateral move systems, drip irrigation systems, etc. breakdown on average three times per year out of 40 uses. These breakdowns occur during critical growing steps and in many cases in the middle of the field.

SUMMARY

To limit delays, increased costs and other problems associated with irrigation system breakdown, this disclosure details a solution including digital observation of the irrigation system during normal operation and set parameters that indicate abnormal operation. To observe these operational anomalies, sensors may be added to the irrigation system to provide data for algorithms to process. These algorithms may be logic or analytics based. Existing operational data from off the shelf may be used in some cases. In aspects, other data sources may be external to the system, such as National Oceanic and Atmospheric Administration (NOAA) weather, topographical maps, soil moisture, etc., or combinations thereof.

According to one aspect, a monitoring system for an irrigation system is presented. The irrigation system includes a movable end gun operatively associated with a portion of the irrigation system. The monitoring system includes a sensor configured to couple to the movable end gun and configured to generate an electrical signal indicative of movement and/or positioning of the movable end gun relative to the portion of the irrigation system over time, a processor, and a memory. The memory includes instructions stored thereon, which when executed by the processor, cause the system to: receive the generated electrical signal, determine whether the movable end gun, or one or more components thereof, requires maintenance based on the electrical signal, and determine when the movable end gun is in an on and/or off trigger state based on the electrical signal.

In another aspect of the present disclosure, the instructions, when executed, may further cause the system to determine an angular rate of the movable end gun and time spent going forward and/or reverse based on the electrical signal.

In yet another aspect of the present disclosure, the instructions, when executed, may further cause the system to generate a report based on the determinations.

In a further aspect of the present disclosure, the instructions, when executed, may further cause the monitoring system to determine if the end gun pivots more than a predetermined number of degrees without an end gun on trigger state and provide an indication to a user that a location was not irrigated based on the determination.

In yet a further aspect of the present disclosure, wherein the portion of the irrigation system includes at least one of a lateral drive, a water winch, or a pivot, and the movable end gun may be movably mounted on the pivot.

In another aspect of the present disclosure, the movable end gun may be part of the same system but separate from the portion of the irrigation system.

In yet another aspect of the present disclosure, the system may further include an analytics engine configured to perform the determinations.

In a further aspect of the present disclosure, the instructions, when executed by the processor, may further cause the monitoring system to receive data from at least one of a weather station, a field soil moisture sensor, a terrain and soil map, a temperature sensor, or National Oceanic and Atmospheric Administration weather.

In yet a further aspect of the present disclosure, the analytics engine may include a machine learning model, and wherein the machine learning model is based on a deep learning network, a classical machine learning model, or combinations thereof.

In another aspect of the present disclosure, the sensor may include an encoder, a pressure sensor, a flow meter, a magnetometer, a gyroscope, an accelerometer, a camera, a gesture sensor, a microphone, a laser range finder, a reed switch, a magnetic switch, a GPS, and/or an optical switch.

In an aspect of the present disclosure, a computer-implemented method for monitoring an irrigation system including four end gun zones is presented. Each end gun zone includes a movable end gun operatively associated with a portion of the irrigation system. The method includes receiving an electrical signal generated by a sensor configured to couple to the movable end gun, wherein the electrical signal is indicative of movement and/or positioning of the movable end gun relative to the portion of the irrigation system over time, determining whether the movable end gun, or one or more components thereof, requires maintenance based on the electrical signal, and determining when the movable end gun is in an on and/or off trigger state based on the electrical signal.

In yet another aspect of the present disclosure, the method may further include determining an angular rate of the movable end gun and time spent going forward and/or reverse based on the electrical signal.

In a further aspect of the present disclosure, the method may further include generating a report based on the determinations.

In yet a further aspect of the present disclosure, the method may further include determining if the end gun pivots more than a predetermined number of degrees without an end gun on trigger state and providing an indication to a user that a location was not irrigated based on the determination.

In another aspect of the present disclosure, wherein the portion of the irrigation system includes at least one of a lateral drive, a water winch, or a pivot, and the movable end gun may be movably mounted on the pivot.

In yet another aspect of the present disclosure, the movable end gun may be part of the same system but separate from the portion of the irrigation system.

In a further aspect of the present disclosure, the method may further include performing the determinations by an analytics engine.

In yet a further aspect of the present disclosure, the method may further include receiving data from at least one of a weather station, a field soil moisture sensor, a terrain and soil map, a temperature sensor, or National Oceanic and Atmospheric Administration weather.

In yet another aspect of the present disclosure, the analytics engine includes a machine learning model, and wherein the machine learning model is based on a deep learning network, a classical machine learning model, or combinations thereof.

In an aspect of the present disclosure, a non-transitory computer-readable medium stores instructions that, when executed by a processor, cause the processor to perform a method for monitoring an irrigation system is presented. The irrigation system includes a plurality of end gun zones. Each end gun zone, of the plurality of end gun zones, includes a movable end gun operatively associated with a portion of the irrigation system. The method includes receiving an electrical signal generated by a sensor configured to couple to the movable end gun, wherein the electrical signal is indicative of movement and/or positioning of the movable end gun relative to the portion of the irrigation system over time, determining whether the movable end gun, or one or more components thereof, requires maintenance based on the electrical signal, and determining when the movable end gun is in an on and/or off trigger state based on the electrical signal.

Other aspects, features, and advantages will be apparent from the description, the drawings, and the claims that follow.

BRIEF DESCRIPTION OF DRAWINGS

The accompanying drawings, which are incorporated in and constitute a part of this specification, illustrate aspects of the disclosure and, together with a general description of the disclosure given above and the detailed description given below, serve to explain the principles of this disclosure, wherein:

FIG. 11A is a perspective view of an end gun assembly of the predictive maintenance system in accordance with principles of this disclosure;

FIG. 11B is a side view of the end gun assembly of FIG. 11A;

FIGS. 12A-12C are example signals generated with the predictive maintenance system of FIG. 11A;

FIGS. 13A and 13B illustrate exemplary flow charts of predictive maintenance systems including end gun monitoring in accordance with principles of this disclosure;

FIG. 14 illustrates exemplary data science work-flow of the predictive maintenance systems of this disclosure;

DETAILED DESCRIPTION

Figure 1:
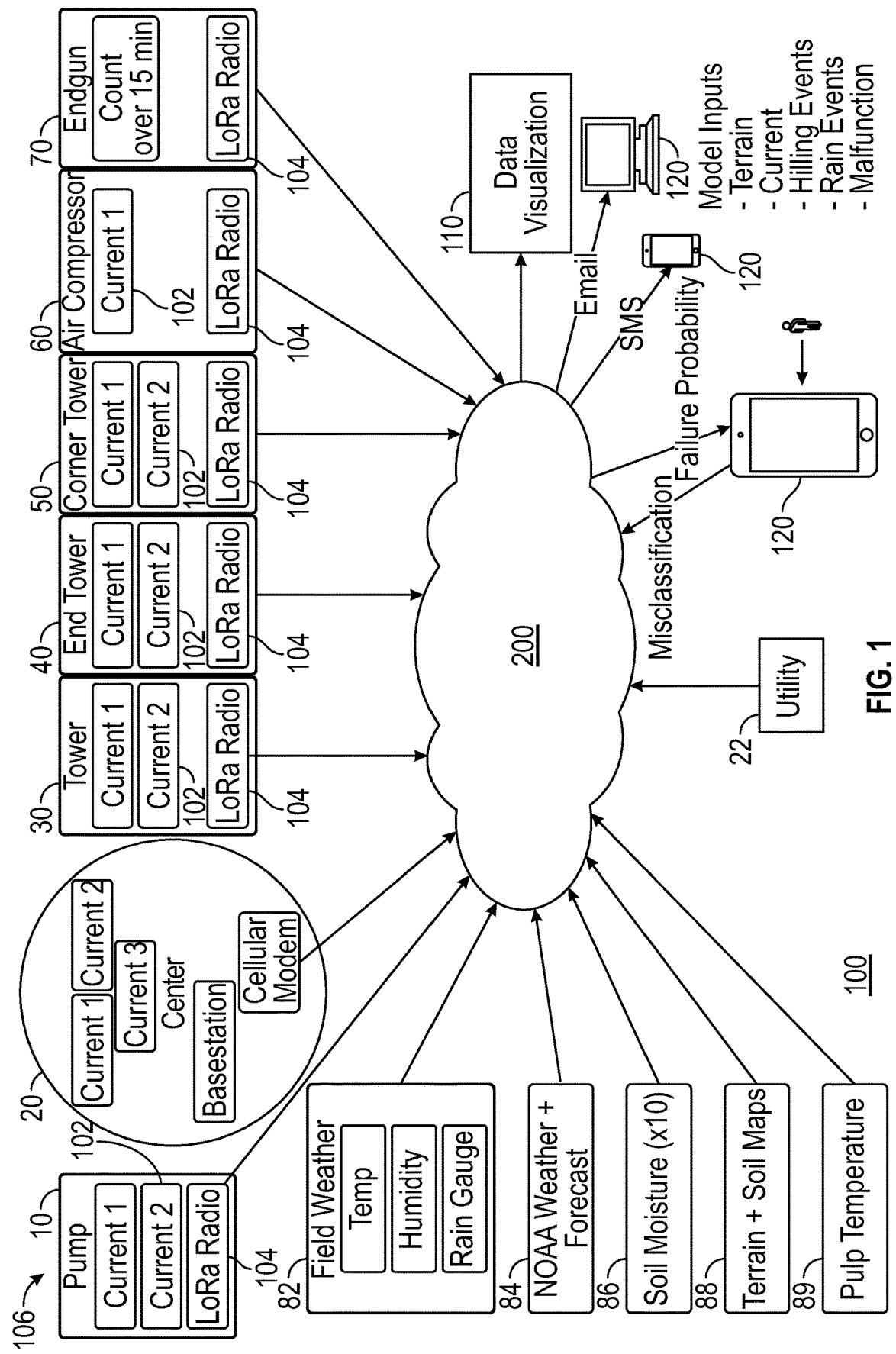
FIG. 1 is a diagram illustrating a monitoring system.

Aspects of the disclosed predictive maintenance systems are described in detail with reference to the drawings, in which like reference numerals designate identical or corresponding elements in each of the several views. Directional terms such as top, bottom, and the like are used simply for convenience of description and are not intended to limit the disclosure attached hereto. Also, as used herein, the term "on" includes being in an open or activated position, whereas the term "off" includes being in a closed or inactivated position.

In the following description, well-known functions or constructions are not described in detail to avoid obscuring the present disclosure in unnecessary detail.

Advantageously, the disclosed system predicts common unexpected downtime versus notification that it occurred after the fact. The disclosed system provides better insight than a team driving around to observe operation (which can be subjective). Technology today only notifies of failure after the failure has occurred, whereas the disclosed system predicts a maintenance requirement before the failure occurs.

With reference to FIGS. 1 and 7-9, a monitoring system 100 for an irrigation system (for farming, mining, etc.) is provided. Generally, the monitoring system 100 includes an irrigation system 106 and a controller 200 configured to execute instructions controlling the operation of the pivot monitoring system 100. The irrigation system 106 may include a pump 10 (e.g., a compressor or booster pump, see FIG. 11), a pivot 20, one or more towers 30, an end tower 40, a corner tower 50, an air compressor 60, and an end gun 70 (also known as a big gun, big volume gun, and/or movable nozzle). The pump 10 may include one or more current sensors and a wireless communication device 104 configured to transmit data wirelessly to the controller 200 (e.g., sensed current data). The pivot 20 may include one or more sensors 102 and a wireless communication device 104 configured to transmit data wirelessly to the controller 200. Each tower 30, corner tower 50, and end tower 40 may include one or more sensors 102 and a wireless communication device 104 configured to transmit data wirelessly to the controller 200. The wireless communication device may include, for example, 3G, LTE, 4G, 5G, Bluetooth, and/or Wi-Fi, etc. The sensors 102 may include at least one of a current sensor, a voltage sensor, and/or a power sensor configured to sense, for example, current, voltage, and/or power, respectively. In aspects, these sensors 102 may measure the transmission of electricity into a motor of the booster pump 10 motor when part of the system. The pump 10 may include the transmission lines on the span; a contactor; and components used to actuate the contactor, the motor components including the electrical components, mechanical components, and the pump components including the impeller, inlet, outlet, and/or tubing. In aspects, the pump 10 may include a flow sensor (not shown) on the booster pump outlet.

In aspects, the one or more sensors 102 can include any suitable sensors such as, for example, an encoder (e.g., an angular encoder), pressure sensor, flow meter, etc., or combinations thereof. An angular encoder may be in a form of position sensor that measures the angular position of a rotating shaft.

In aspects, the one or more sensors may be connected (e.g., directly) and/or may be standalone components that may be connected via wide area network (WAN). In aspects, the one or more sensors may be aggregated in the cloud based on provisioning settings. In aspects, the one or more sensors may include, for example, low-power wide area network technology (LPWAN) which may be long-range (LoRa).

In aspects, the controller 200 may determine changes in the condition of the at least one component based on comparing the generated signal to predetermined data.

The controller 200 is configured to receive data from the sensors 102 as well as from external data sources such as weather stations 82, field soil moisture sensors 86, terrain and soil maps 88, temperature sensors 89, and/or National Oceanic and Atmospheric Administration (NOAA) weather 84 to make and/or refine predictions indicative of a condition of at least one component (e.g., a pivot 20, an end gun 70, a tower 30, etc.) of the plurality of components of the irrigation system 106. This prediction enables the controller 200 to determine changes in the condition of the at least one component and predict maintenance requirements of the at least one component based on predetermined data (e.g., historical data). For example, the prediction may be based on comparing the determined changes in the condition of at least one component of the irrigation system 106 to predetermined data. For example, the sensor 102 of a tower 30 may sense the typical current draw of that tower 30. The sensed current draw may then be compared by the controller 200 to historical and/or typical tower current draw. The controller may determine that the sensed current draw of this tower 30 is considerably higher than the historical current draw by a predetermined number (e.g., about 30%) for a particular set of conditions (sunny day, dry soil, etc.). Based on this determination, the controller 200 may predict that this tower 30 needs maintenance. Additionally, the specific type of maintenance may be able to be predicted. For example, if the motor current of a tower 30 is high, it may indicate a flat tire. The pivot monitoring system 100 may additionally or alternatively predict the number of hours typically taken to repair such an occurrence. In another example, the system may sense, by the sensor 102 that the current on a pump 10 is low, and accordingly, predict that there is a pump 10 failure. In an example, a terrain map identifies if the pivot 20 is sloped down-hill, thus increasing the pressure at the end gun 70, which facilitates a determination of why pressure is higher for that particular area.

Data from the external data sources may be used to improve model predictions. For example, by processing data such as higher power use to motors of the towers 30 because the field is muddy due to recent rain, such processed data can be used to improve model predictions. The pivot monitoring system 100 may display field maps for terrain, soil types, etc., that help the model explain variation in power use. The predictions may be transmitted to a user device 120, by the controller 200, for display and/or further analysis.

In aspects, the data and/or predictions may be processed by a data visualization system 110. Data visualization is the graphical representation of information and data. By using visual elements like charts, graphs, and maps, data visualization tools provide an accessible way to see and understand trends, outliers, and patterns in data.

In aspects, the pivot monitoring system 100 may be implemented in the cloud. For instance, Linux, which may run a Python script, for example, can be utilized to effectuate prediction.

Figure 2:
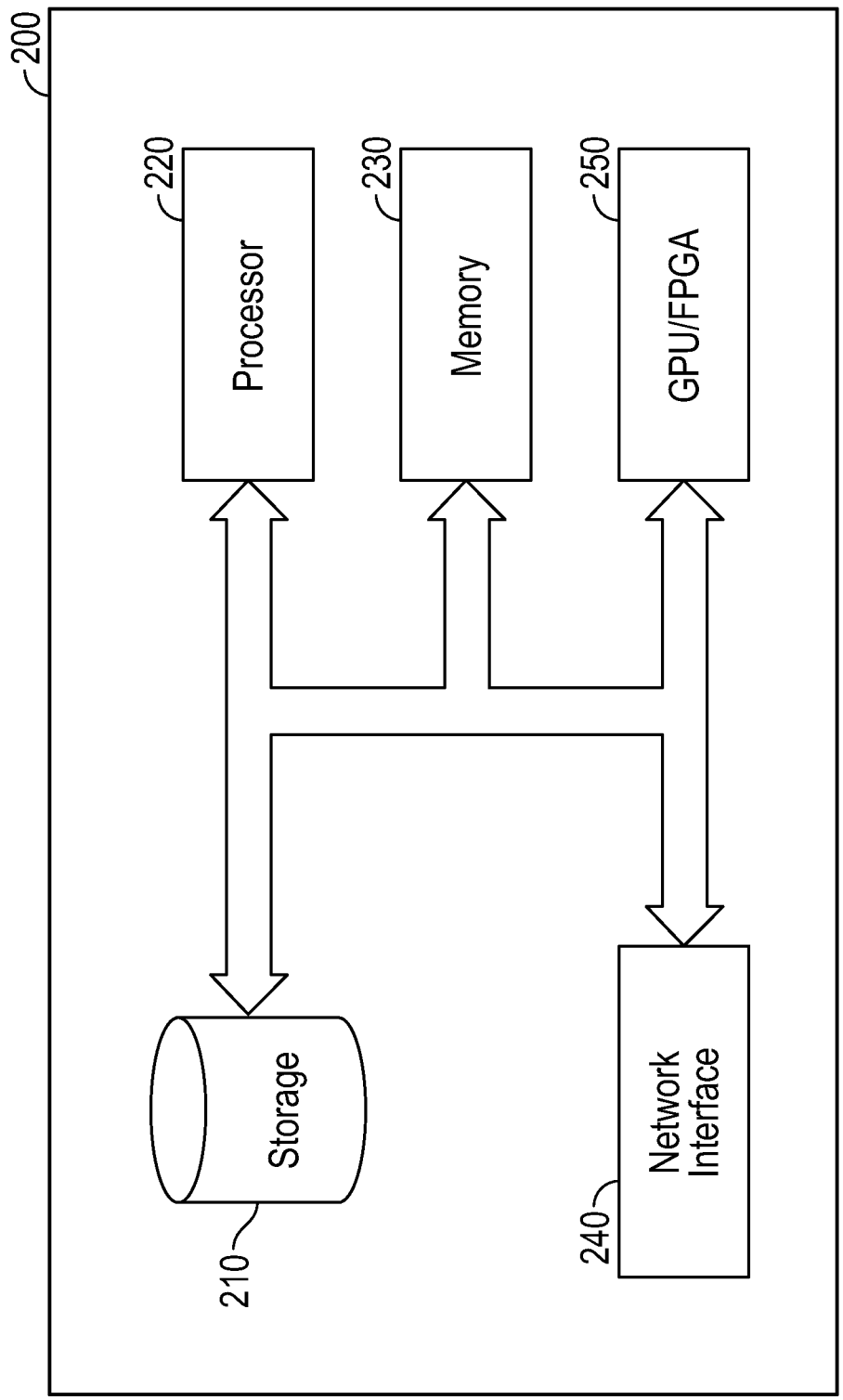
FIG. 2 is a block diagram of a controller configured for use with the predictive maintenance system of FIG. 1.

FIG. 2 illustrates that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

In aspects, an analytics engine (e.g., a machine learning model, and/or classical analytics) may be configured to perform the determinations.

Figure 3:
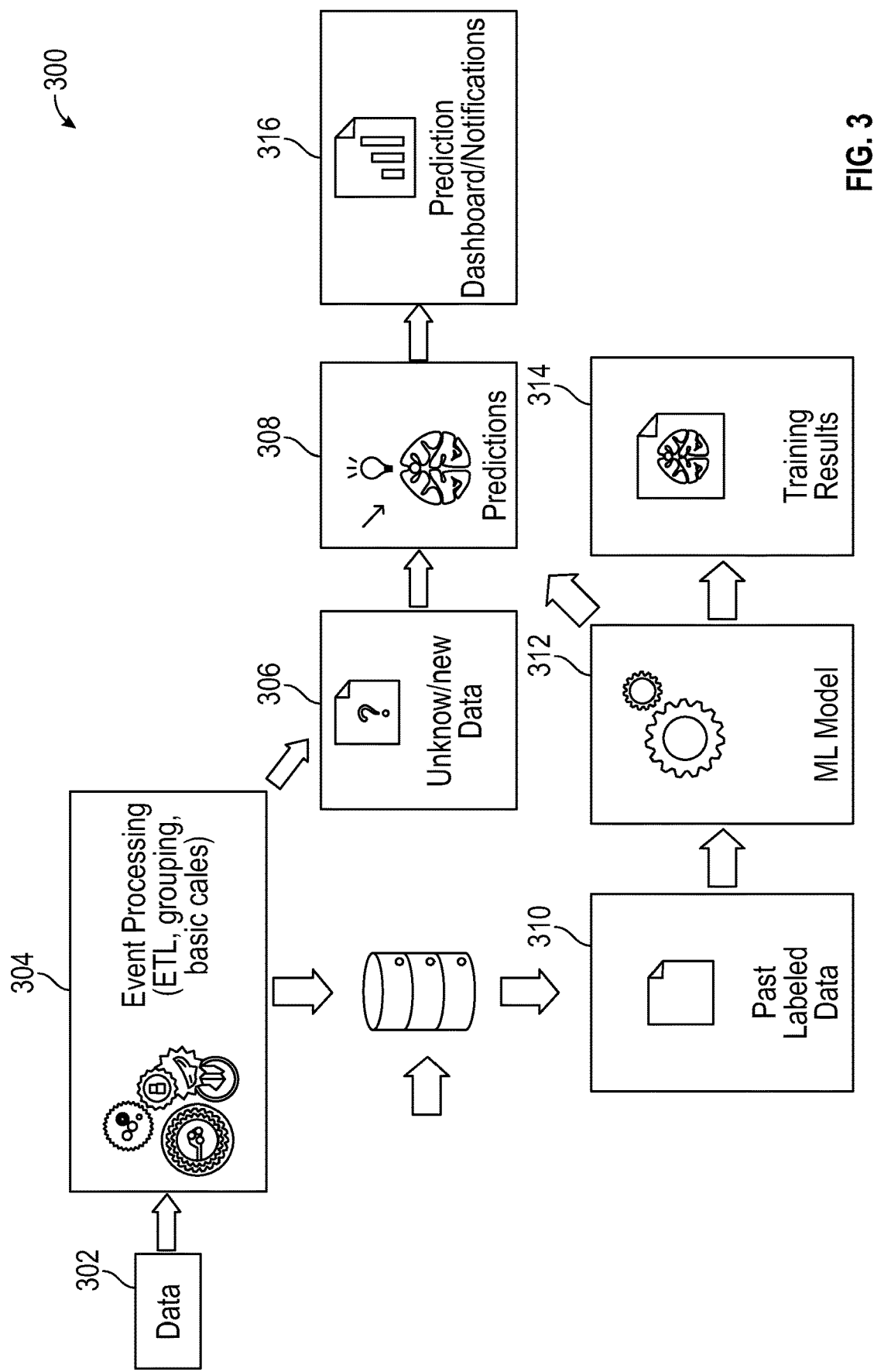
FIG. 3 is a diagram illustrating a machine learning model configured for use with the predictive maintenance system of FIG. 1.

FIG. 3 illustrates a machine learning model 300 and dataflow\storage\feedback of the pivot predictive maintenance system. The machine learning model 300 can be hosted at the pivot 20 or in the cloud (e.g., a remote server). The machine learning model 300 may include one or more convolutional neural networks (CNN).

In machine learning, a convolutional neural network (CNN) is a class of artificial neural network (ANN), most commonly applied to analyzing visual imagery. The convolutional aspect of a CNN relates to applying matrix processing operations to localized portions of an image, and the results of those operations (which can involve dozens of different parallel and serial calculations) are sets of many features that are used to train neural networks. A CNN typically includes convolution layers, activation function layers, and pooling (typically max pooling) layers to reduce dimensionality without losing too many features. Additional information may be included in the operations that generate these features. Providing unique information that yields features that give the neural networks information can be used to ultimately provide an aggregate way to differentiate between different data input to the neural networks. In aspects, the machine learning model 300 may include a combination of one or more deep learning networks (e.g., a CNN), and classical machine learning models (e.g., an SVM, a decision tree, etc.). For example, the machine learning model 300 may include two deep learning networks.

In aspects, two labeling methods for the training data may be used, one based on a connection with a computer maintenance system (CMMS) and one based on user input. In aspects, the user can be prompted to label data, or can provide the data manually (e.g., at time of service events).

Figure 4A:
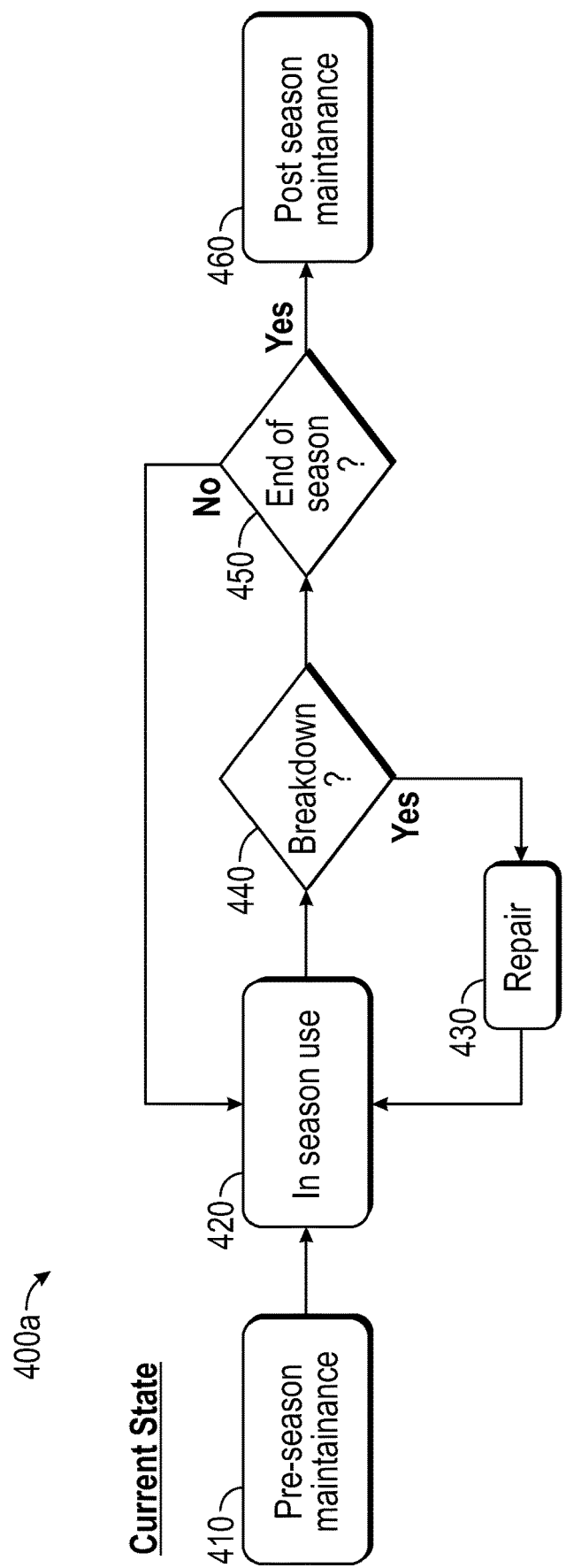
FIG. 4A illustrates an exemplary flow chart of a typical farm operation.

As noted above, FIG. 4A illustrates an exemplary flow chart of a typical farm operation 400a. Generally, at step 410, pre-season maintenance is performed on the irrigation equipment. Next, at step 420, the irrigation equipment is used in season. At step 440, if equipment is determined to have broken down, it is sent in for repair at step 430. At the end of the season (step 450), post-season maintenance is performed (step 460).

Figure 4B:
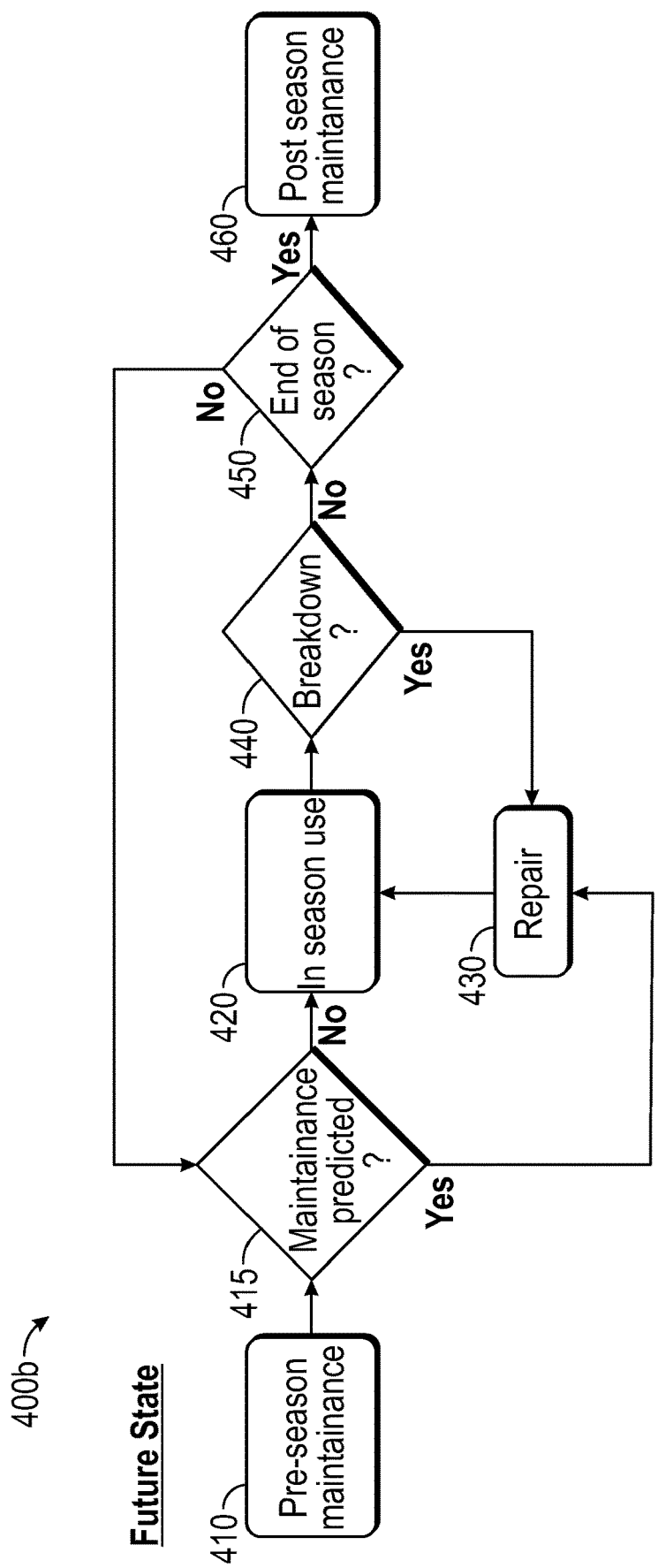
FIG. 4B illustrates an exemplary flow chart of a farm operation including a predictive maintenance system in accordance with the principles of this disclosure.

FIG. 4B illustrates an exemplary flow chart 400b of a farm operation including a monitoring system 100 in accordance with the principles of this disclosure. Generally, at step 410, pre-season maintenance is performed on the irrigation equipment. Next, the monitoring system 100 predicts whether maintenance is needed for a particular piece of the irrigation equipment. If maintenance is predicted at step 415, then at step 430, the equipment is examined and repaired. Next, at step 420, the irrigation equipment is used in season. At step 440, if equipment is determined to have broken down, the equipment is sent in for repair at step 430. At the end of the season (step 450), post-season maintenance is performed (step 460).

Figure 5:
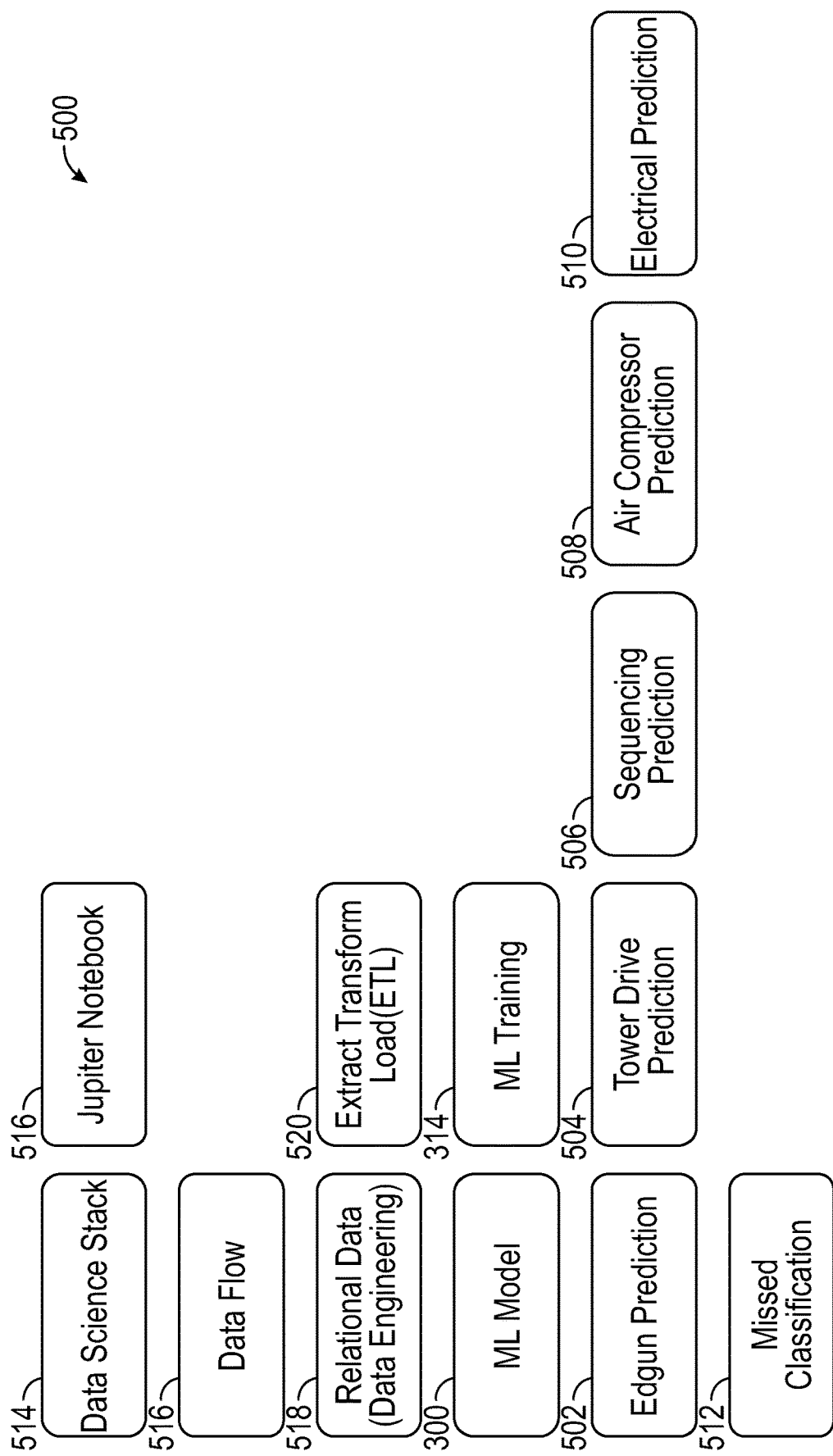
FIG. 5 illustrates a data science work-flow with various models of the predictive maintenance system illustrated in FIG. 1.
Figure 6:
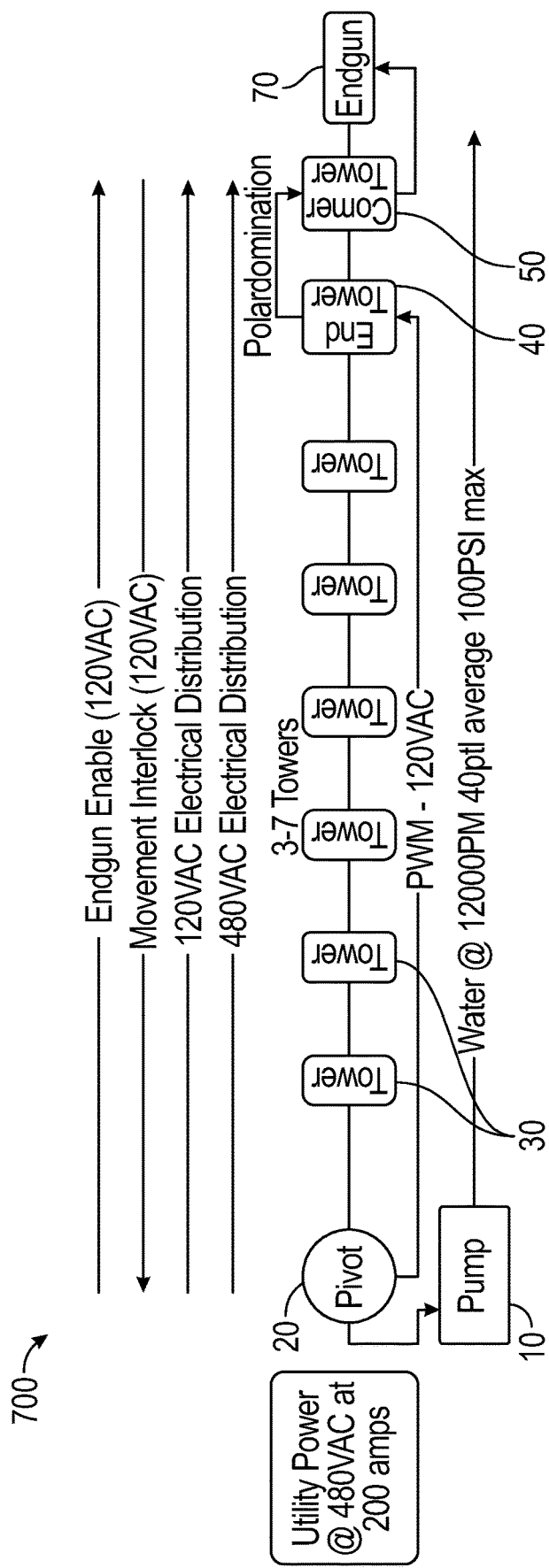
FIGS. 6-8 are diagrams of example hardware interface and instrumentation of the predictive maintenance system of FIG. 1.
Figure 7:
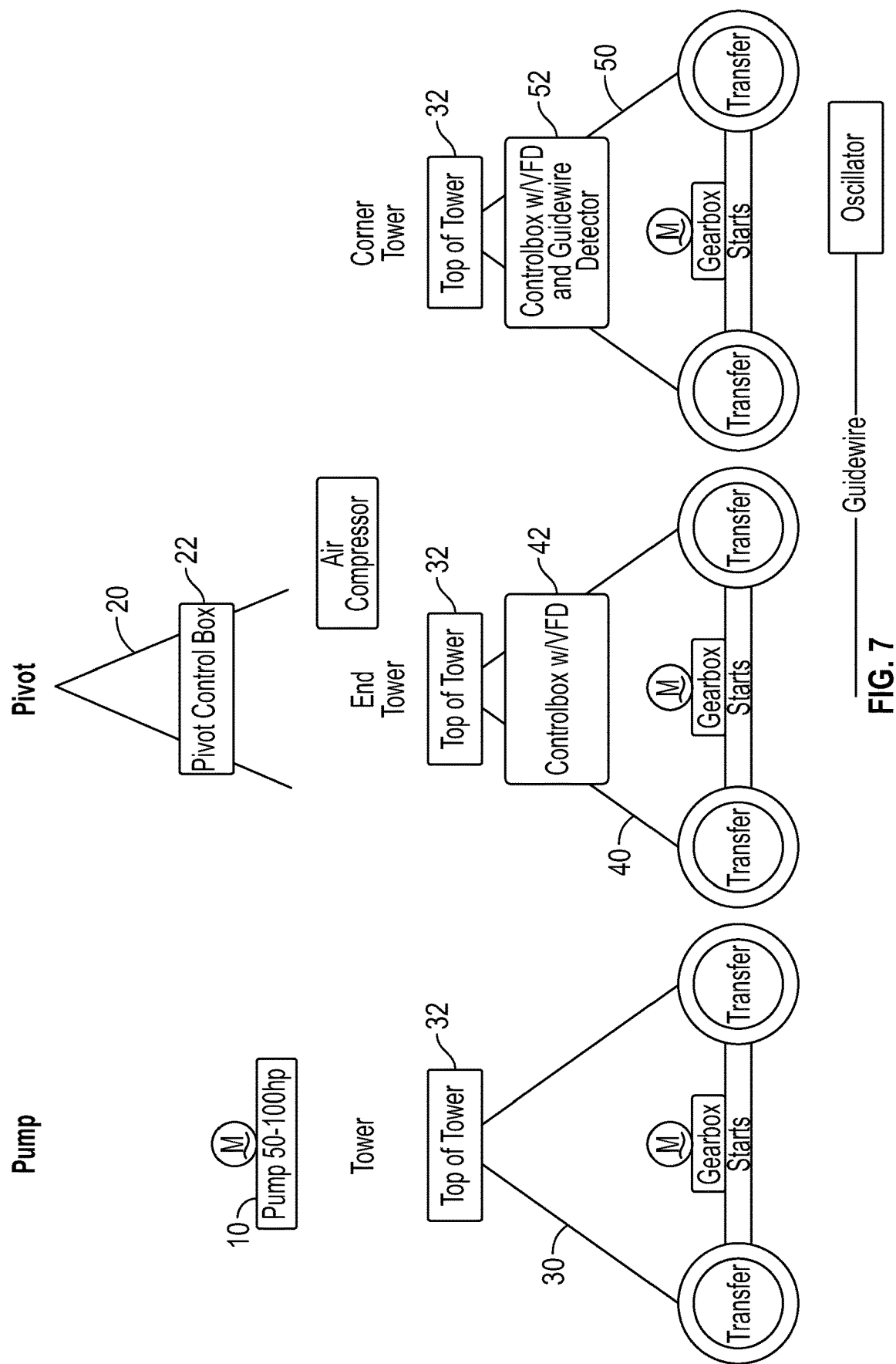
Figure 8:
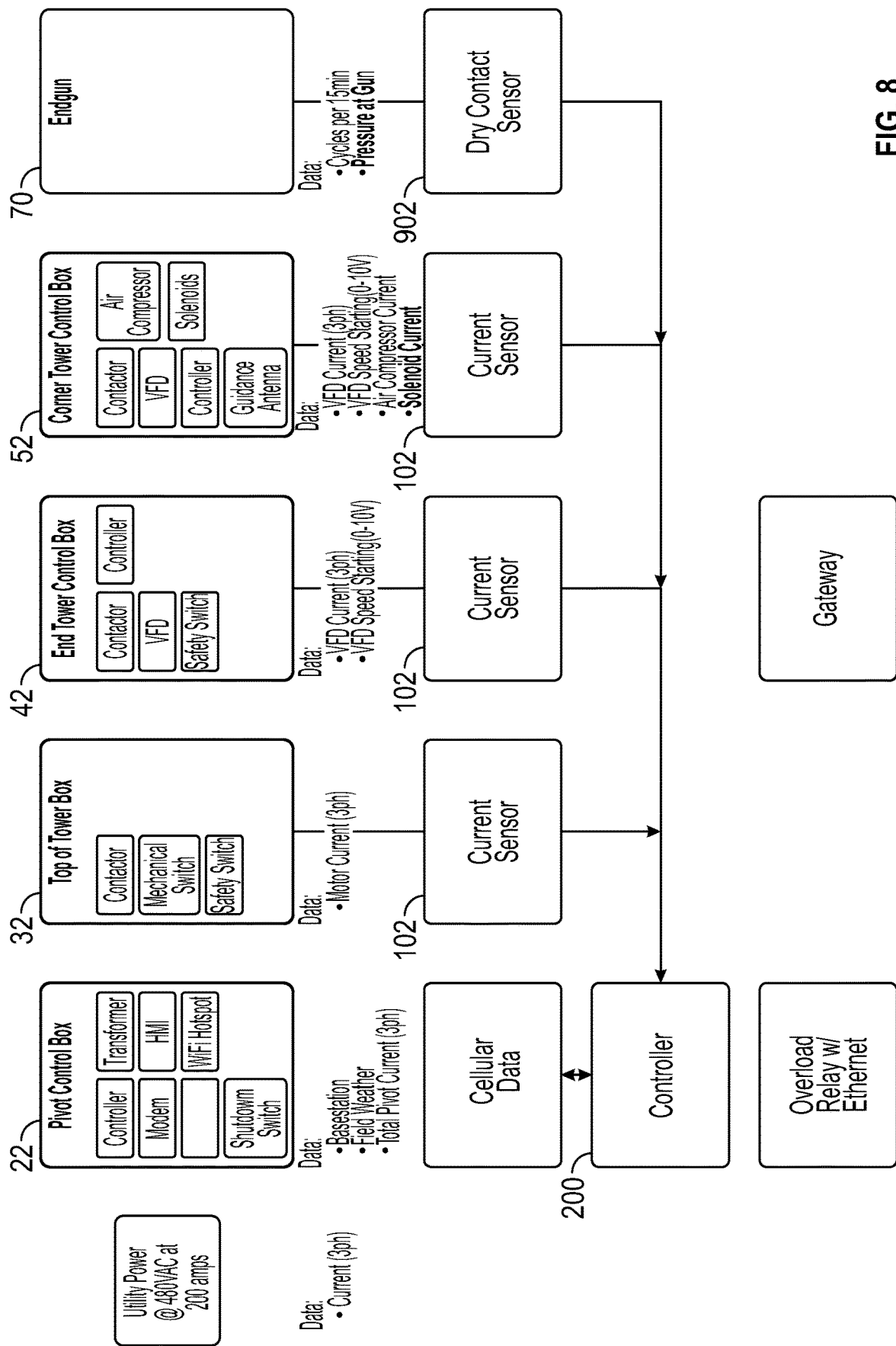

FIG. 5 illustrates a data science work-flow with various models of the predictive maintenance system illustrated in FIG. 4B.

The five models include an end gun prediction model 502, a tower drive prediction model 504, a sequencing prediction model 506, an air compression prediction model 508, and an electrical prediction model 510. The models may be implemented via logic and/or machine learning.

Figure 18:
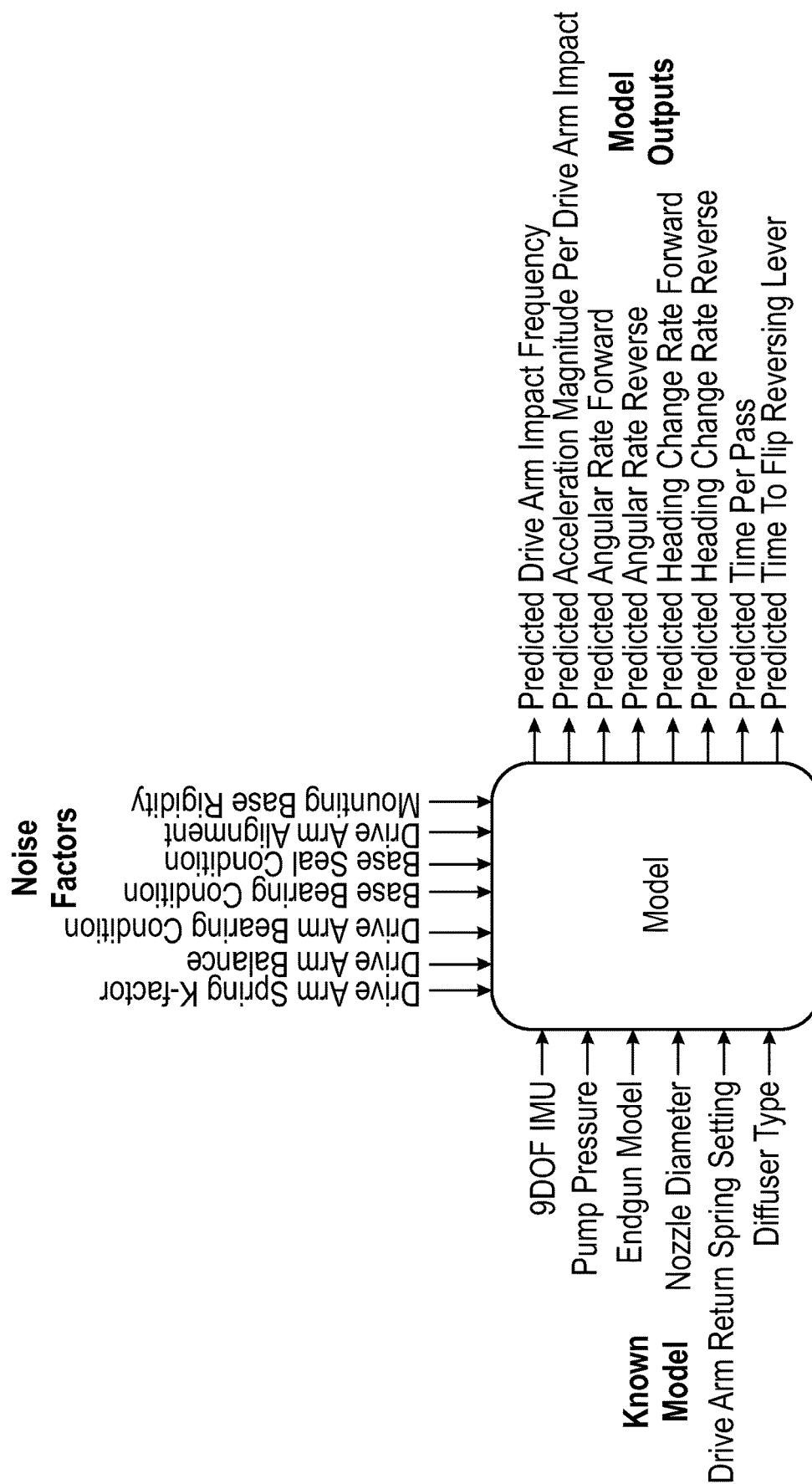
FIG. 18 is an illustrative model for end gun performance prediction using a nine degree of freedom inertial measurement unit.

With reference to FIGS. 5 and 18, an end gun prediction model 502 is shown. The end gun prediction model may count the number of times the end gun 70 (FIG. 1) takes to pass from left to right and back. Expected time to pass left and right may be based on pressure, bearing condition, tension, etc., or combinations thereof.

The end gun prediction model 502 can consider expected power based on soil moisture directly measured or inferred from weather data from the field or regional weather stations, topographical maps, soil maps, motor RPM, gearbox ratio, tower weight, span weight, operating condition, etc., or combinations thereof. The end gun 70 includes instrumentation which can measure each cycle using a proximity switch, encoder, capacitance, and/or image system. Aspects of the monitoring system 100 can be mounted on or off the irrigation system 106, for example, a moisture sensor that logs when the moisture sensor is splashed remotely by the water being distributed to the field. If an electronic gun is used, energy use and duty cycle can be used. In aspects, the one or more sensors can include any suitable sensors such as, for example an encoder (e.g., angular), pressure sensor, flow meter, magnetometer, gyroscope, accelerometer, camera, gesture sensor, microphone, laser range finder, reed/magnetic/optical switch, etc., or combinations thereof. The end gun prediction model 502 may also include as inputs the pump pressure, the model number of the end gun, the end gun nozzle diameter, the drive arm spring setting, the diffuser type, a flow measurement, a drive arm spring K-factor, a drive arm balance, a drive arm bearing condition, a base bearing condition, a base seal condition, a drive arm alignment, and/or a mounting base rigidity (FIG. 18). The nozzle type can be inferred from a measured flow and measured pressure. In aspects, the end gun prediction model 502 (FIG. 18) may predict a drive arm impact frequency, an acceleration magnitude per drive arm impact, an angular rate forward, an angular rate reverse, a heading change rate forward or reverse, a time per pass, and/or a time to flip a reversing lever. The model outputs can be used to further predict abnormal operation.

Abnormal operation of the end gun may be further based on movement and/or positioning of the movable end gun 70 relative to the pivot 20 (and/or other portion of the irrigation system, such as a lateral drive, a water winch, etc.) over time. For example, the pivot monitoring system 100 may monitor the drive arm frequency using an accelerometer and/or gyroscope, and/or the heading change of the end gun 70 may be determined by a magnetometer. The end gun 70 may typically be "on" for about fifteen degrees of rotation from the time it is started to the time it is stopped. The sensor 102 may sense that the end gun 70 was on for about three degrees of rotation and the controller may determine that this was abnormal operation and that the end gun 70 may need maintenance. In aspects, the logic for determining abnormal operation may be based on a sliding window over seconds, minutes, hours, days, and/or years. In aspects, there is a traveling end gun 70 without spans known as water winches. The disclosed technology also applies to water winches and lateral move irrigation systems. In aspects, a movable end gun 70 may be disposed on the water winch. In some examples, a water winch moves on tires, in other examples, the end gun 70 moves rotationally by the drive arm, or a gear energized by water flow. In an example, a water winch may be moved by another vehicle such as a tractor or a truck. In another example, the water winch may be pulled by a flexible water pipe pulls it along a path via a reel. In yet another example, the end gun 70 may be directly mounted on a truck to keep dust down in a mine, and/or to apply wastewater to a field. In another example, the end gun 70 may not be mounted on the pivot, but rather mounted on a boom, and/or a last regular drive unit in the pivot style irrigation system.

Monitoring output parameters such as end gun 70 timing, flow, an/or pressure can also help infer air compressor health. In aspects, abnormal operation may further be determined by the water pressure and/or volume from the end gun 70.

For example, if a user (e.g., a farmer) was applying too much pressure to the end gun 70, and the water and fertilizer may get thrown over the crop, leading to dry rings. The pressure sensor may sense that the end gun pressure was dropping to about 40 psi from a normal 71 psi. The end gun prediction model 502 may predict that the system is operating abnormally based on the pressure measurement over time. The pressure may have been initially high, and then drop about 10 psi over the next hour. The farmer may have been operating at too high of a pressure because the booster pump was dropping out and restarting frequently. The pump restarting is very detrimental to the health of the irrigation system 106, as the pump may wear out the electrical components well ahead of their rated life.

Electrical Instrumentation:

The system may also monitor contactors, commutator rings, motor windings, electrical connections, and/or wiring failures. Monitoring electrical transients or power metrics such as THD, Power Factor, current balance can help infer electrical system health.

Monitoring temperatures of the components listed above can also help infer electrical system health.

With reference to FIGS. 11A, 11B, and 12A-12C the movable end gun 70 supports an electronics enclosure 1110 that supports at least one sensor 1120 including an accelerometer, gyroscope, a microphone, a pressure sensor, flow sensor, and/or magnetometer, a power source or battery 1130, a circuit 1140 (e.g., a controller), and/or a solar panel 1150 that can be electrically coupled to one another. In aspects, the sensor 1120 may be mounted overhead, underneath, and/or on the side of the end gun 70. In aspects, the sensor 1120 may include a water quality sensor that measures, for example, iron, calcium, salts, and/or organic material. The moveable end gun 70 includes an elongated shaft 1104 defining a longitudinal axis and is pivotably coupled to a span (see e.g., FIG. 9) of the irrigation system 106 to enable the elongated shaft 1104 to pivot relative to the span about a pivot axis "A" extending through the elongated shaft 1104 that is transverse to the longitudinal axis of the elongated shaft 1104. The movable end gun 70 further includes an end gun nozzle 1106 disposed at an end portion of the elongated shaft 1104. The movable end gun 70 further includes a deflector assembly 1104a pinned to movable end gun 70 via a pin 1104c. The deflector assembly 1104a supports a deflector 1104b on a distal end portion thereof.

Figure 15:
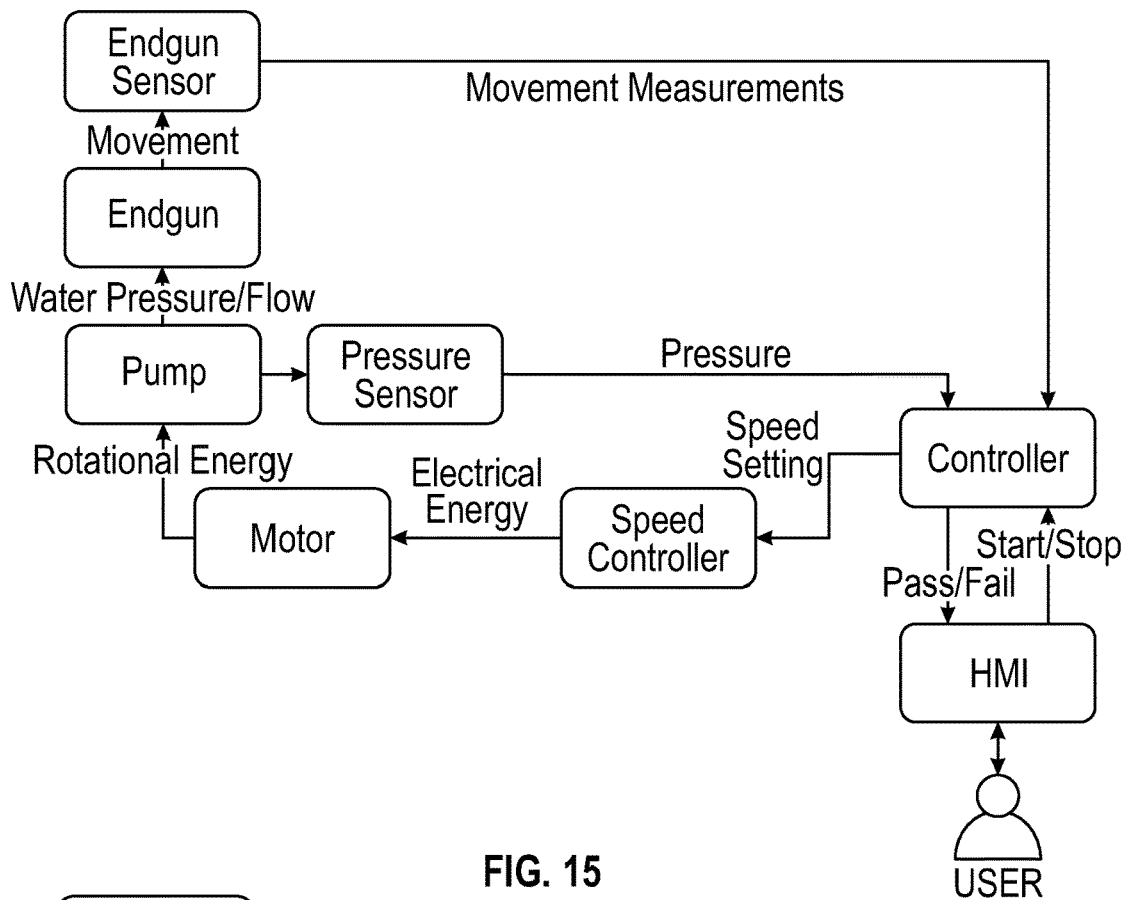
FIGS. 15-17 are illustrative flow charts for testing systems of the predictive maintenance systems of this disclosure.
Figure 16:
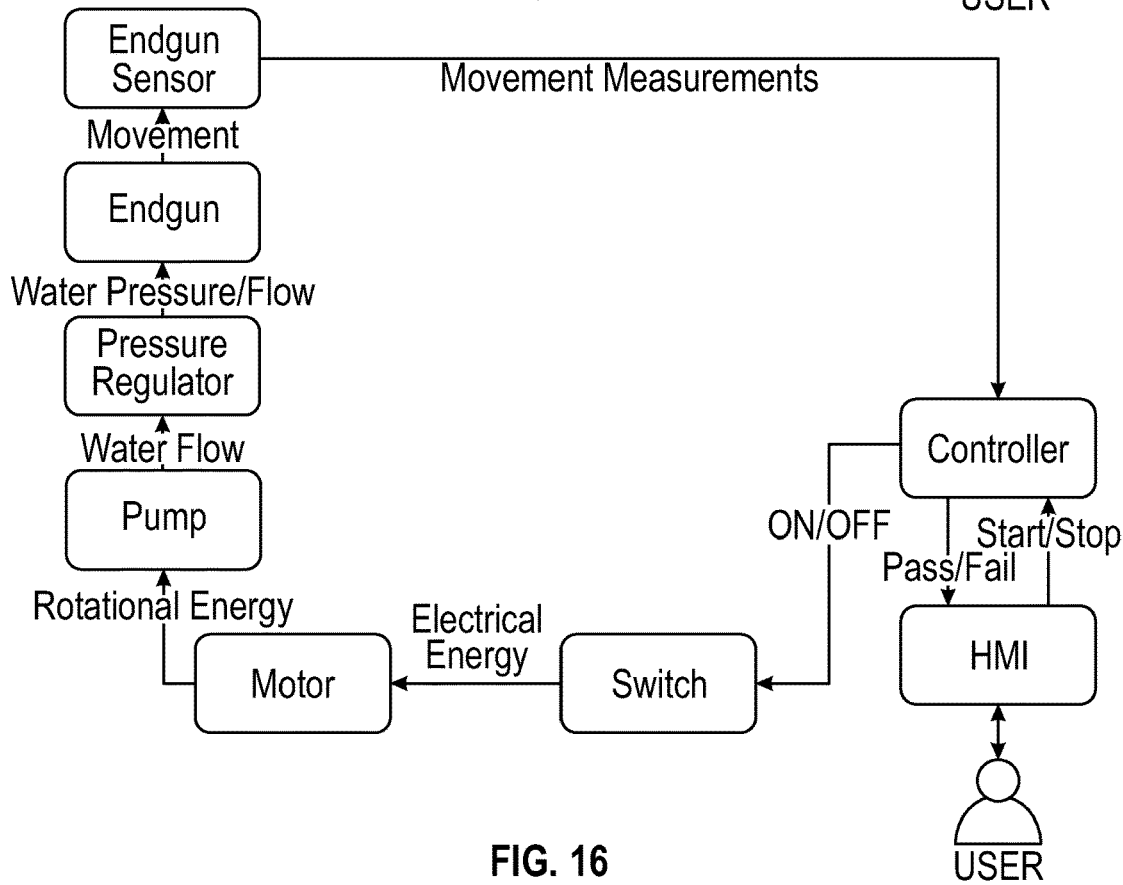

In aspects, the magnetometer may determine the heading and/or typical travel for an end gun 70 (see FIGS. 15 and 16). For example, typical travel for an end gun 70 may range from about 100 to about 150 degrees in rotation. If the drive arm return spring 1210 changes because of a poor setting, or due to a tree branch pulling it, heading accuracy may be at least about 10 degrees. In other cases, end guns 70 never change direction, or may travel outside of 100 to 150 degrees.

The movable end gun 70 can further support an encoder assembly 1160 having an encoder 1162 and an encoder disc 1164 that is coupled to electronics enclosure 1110. A pressure sensor 1170 is also coupled to electronics enclosure 1110 to measure fluid flow pressure through end gun 70 (FIG. 15). Pressure may indicate the volume of water dispensed. Further, a reed switch 1180 or other magnetic switch can be coupled to movable end gun 70 and disposed in proximity to a magnet 1190 supported on the pivot 20 (FIG. 1). As can be appreciated, any the disclosed electronics components can electrically couple to circuit 140 via wired or wireless connection (see FIGS. 13A and 13B). Notably, one or more of the accelerometer, gyroscope, magnetometer, encoder assembly, and/or any other suitable sensor(s) is configured to generate an electrical signal indicative of movement and/or positioning (e.g., acceleration, speed, distance, location, etc.) of the movable end gun 70 relative to the pivot 20 over time (seconds, minutes, hours, days, years, etc.). The controller 200 is configured to receive the electrical signal and determine whether the movable end gun requires maintenance based on the electrical signal. The controller 200 can send a signal and/or alert indicating the health of the end gun and/or whether maintenance is required thereon based on predetermined data or thresholds which may be part of a database, program and/or stored in memory (e.g., supported on the circuit, in the cloud, on a network, server, etc.).

When there is a mechanical problem with the end gun, the angular rate may decrease. Furthermore, the ratio of time forward to time reverse may become less balanced and time spent going forward will become much longer than the return speed.

FIGS. 12A and 12B are example signals generated during one pass left to right of the end gun with the predictive maintenance system of FIG. 11A. In aspects, the end gun prediction model 502 may use ratios of factors such as total pass period (Tc), forward angular rate (T1), reverse angular rate (T2), number of forward turns (n), number of reverse turns (m), forward angular rate, and/or reverse angular rate, to indicate diminished health of the end gun. For example, an end gun in perfect health may have a ratio of forward angular rate to reverse angular rate of 1. Whereas this ratio may start to deviate from 1 as end gun health diminishes. In another example, a slope of the gyro signal over time during forward movement or reverse movement may be proportional to angular acceleration. This slope may be used by the end gun prediction model 502 to predict abnormal operation of the end gun. In aspects, when there is a mechanical problem, the angular rate may decrease. Furthermore, the ratio of time forward to time reverse may become less balanced and time spent going forward will become much longer than the return speed.

With reference to FIGS. 13A, 13B, and 14, the disclosed predictive maintenance systems, which may be in the form of a smart end gun for end gun predictive maintenance, may operate using any suitable number or type of analytics and/or logic approaches such as control charting, machine learning ("ML") anomaly detection, parameter limit alarms, etc. For example, the predictive maintenance system may use a signal that fails to meet a given threshold related to free movement of the end gun 70 such as peak rotational speed during drive arm impact, or time it takes to complete one Left-Right-Left Cycle, to predict abnormal behavior.

In aspects, geolocation reporting may be used as an input to the ML model 300. For example, a GPS, may be used to determine a wet zone versus a dry zone, and train as a "digital twin" as the irrigation system moves about the field. The altitude of the end gun 70 (relative to the pivot) is also useful in predicting expected pressure. Pressure signal analysis may be used as an input to the ML model 300.

FIG. 15 shows a flow chart for testing systems of the predictive maintenance systems of this disclosure.

In aspects, the disclosed predictive maintenance systems can be a separate system that can be selectively attached or retrofit to an end gun 70, or in some aspects, the predictive maintenance system can be built directly into an end gun 70.

Figure 17:
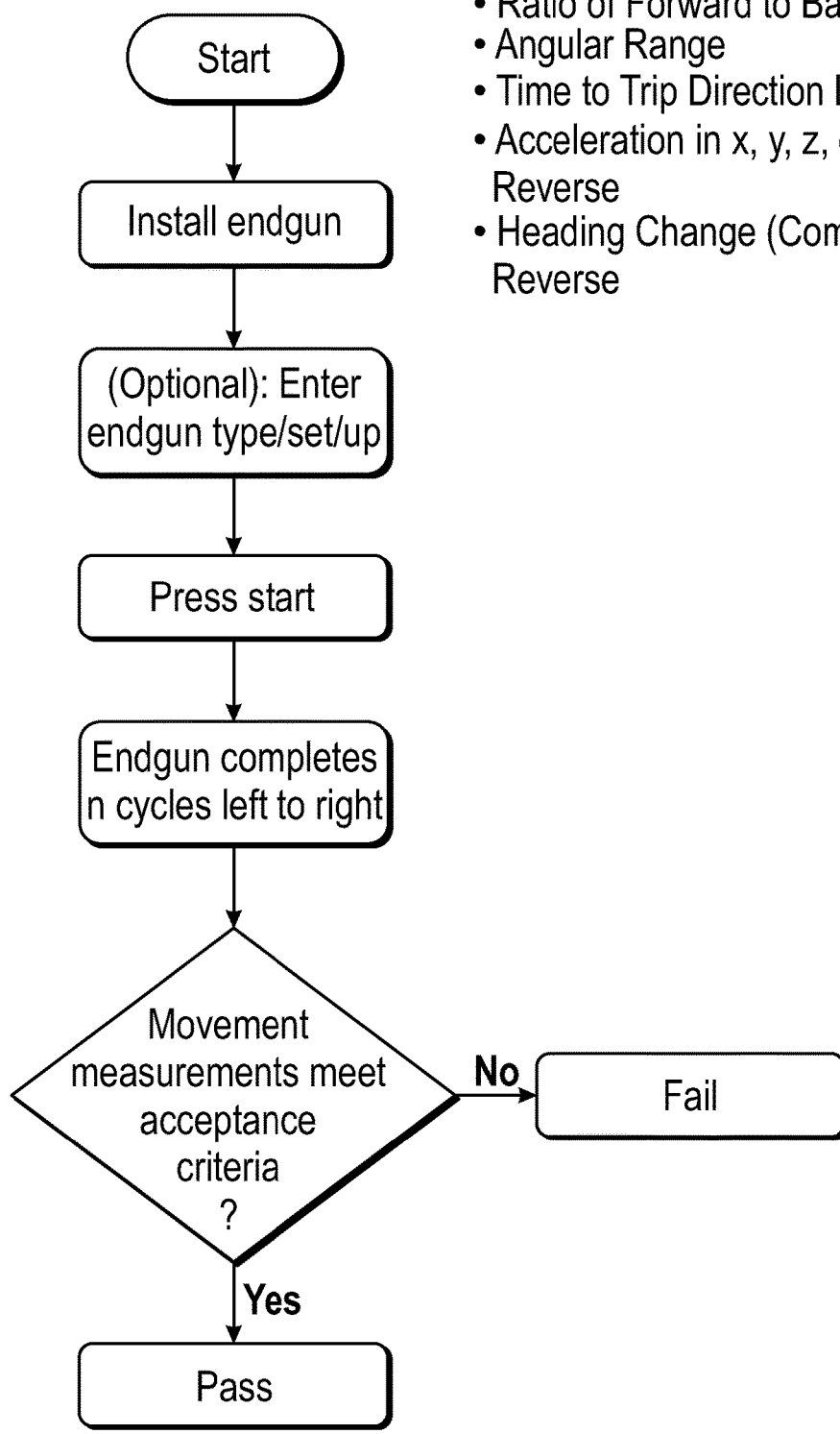

FIG. 17 shows a logic diagram for the disclosed technology. The predictive maintenance system may look at various movement acceptance criteria such as forward/reverse angular rate, ratio of forward to backward movement, angular range, time to trip detection lever, acceleration in x/y/z/ forward/reverse directions, and/or heading change forward and reverse. These movements are proportional to water pressure. In aspects, the slope of the accelerometer and/or gyro signal over time, and/or the waveforms from the gyro and/or accelerometer over time may also be used to determine abnormal operation of the end gun.

Moreover, the disclosed structure can include any suitable mechanical, electrical, and/or chemical components for operating the disclosed pivot predictive maintenance system or components thereof. For instance, such electrical components can include, for example, any suitable electrical and/or electromechanical, and/or electrochemical circuitry, which may include or be coupled to one or more printed circuit boards. As used herein, the term "controller" includes "processor," "digital processing device" and like terms, and are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud computing-based storage. In various aspects, the storage and/or memory device is a combination of devices such as those disclosed herein.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the system, components thereof, and/or resources thereof. As used herein, the term "network" can include any network technology including, for instance, a cellular data network, a wired network, a fiber optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The machine learning ("ML") model may be the most efficient for complex failures. However, basic logic can be used for simpler failure modes. Likely signals of abnormal operation may come from increases in energy required to move the irrigation system, changes in speed of the system, or changes in sequence of the towers moving, end gun turn frequency, or power quality metrics such as phase balance, inrush current, power factor, THD. Since these vary with a complex inference space, ML can assist in predicting abnormal operation and simplify user and subject matter expert input by giving a simple labeling method.

In aspects, the abnormal operation may be predicted by generating, based on the received first set of sensor signals, a data structure that is formatted to be processed through one or more layers of a machine learning model. The data structure may have one or more fields structuring data. The abnormal operation may further be predicted by processing data that includes the data structure, through each of the one or more layers of the machine learning model that has been trained to predict a likelihood that a particular piece of equipment may require maintenance; and generating, by an output layer of the machine learning model, an output data structure. The output data structure may include one or more fields structuring data indicating a likelihood that a particular piece of equipment may require maintenance. The abnormal operation requirement may further be predicted by processing the output data structure to determine whether data organized by the one or more fields of the output data structure satisfies a predetermined threshold, wherein the output data structure includes one or more fields structuring data indicating a likelihood that a particular piece of equipment may require maintenance; and generating the prediction based on the output data of the machine learning model. The prediction includes the abnormal operation. The training may include supervised learning.

The machine learning model may be trained based on observing where the end gun 70 turns on, the speed at which the end gun 70 completes a Left-Right-Left Cycle, peak gyro speed, GPS coordinates which the end gun 70 turns on, pressure at a given GPS location, and use that as a "digital twin" to set a baseline operation to compare to when in service. In aspects, pressure transient data when the end gun 70 turns on and off may be used as an input to the machine learning model for training. The pressure transient data may be used to identify valve operation issues that can lead to the valve sticking open or closed. In aspects, irrigated acres of a field may be automatically mapped to replace or supplement the current practice of "flagging," by which an irrigation team member drives around the field with a laser range finder and places flags to create a field map that may be used to plant and manage the field. Looking at the pressure at the end of the pivot 20 and on the end gun 70, the machine learning model may be able to identify/predict potential issues in water supplied, well, well motors, spans, VFDs, filters, booster pumps, and/or other components of the pivot. The pressure transient measurements may be sensed using a relatively high time resolution (<100 msec). In aspects, a user may configure the on and/or off zones of the end gun 70. In aspects, endgun kinematic parameters, as well as pressure transients for end gun valve pressure and/or corner arm sequencing pressure may be used as an input to the machine learning model. This reference observation may be used to enable location and/or well pressure based analytics to improve the sensitivity and accuracy of the system.

Figure 9:
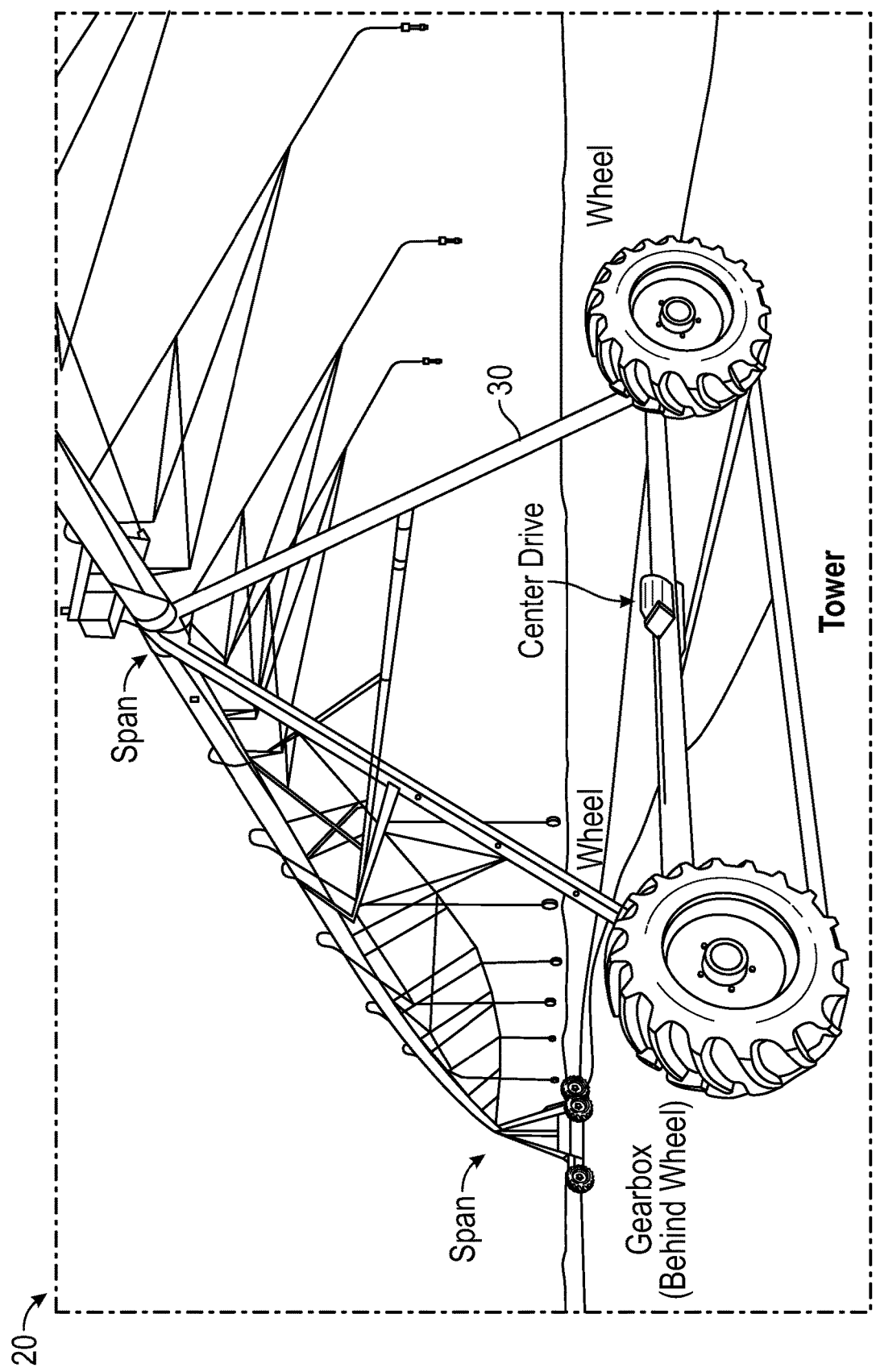
FIG. 9 is perspective view of a portion of an exemplary pivot of the predictive maintenance system of FIG. 1.
Figure 10:
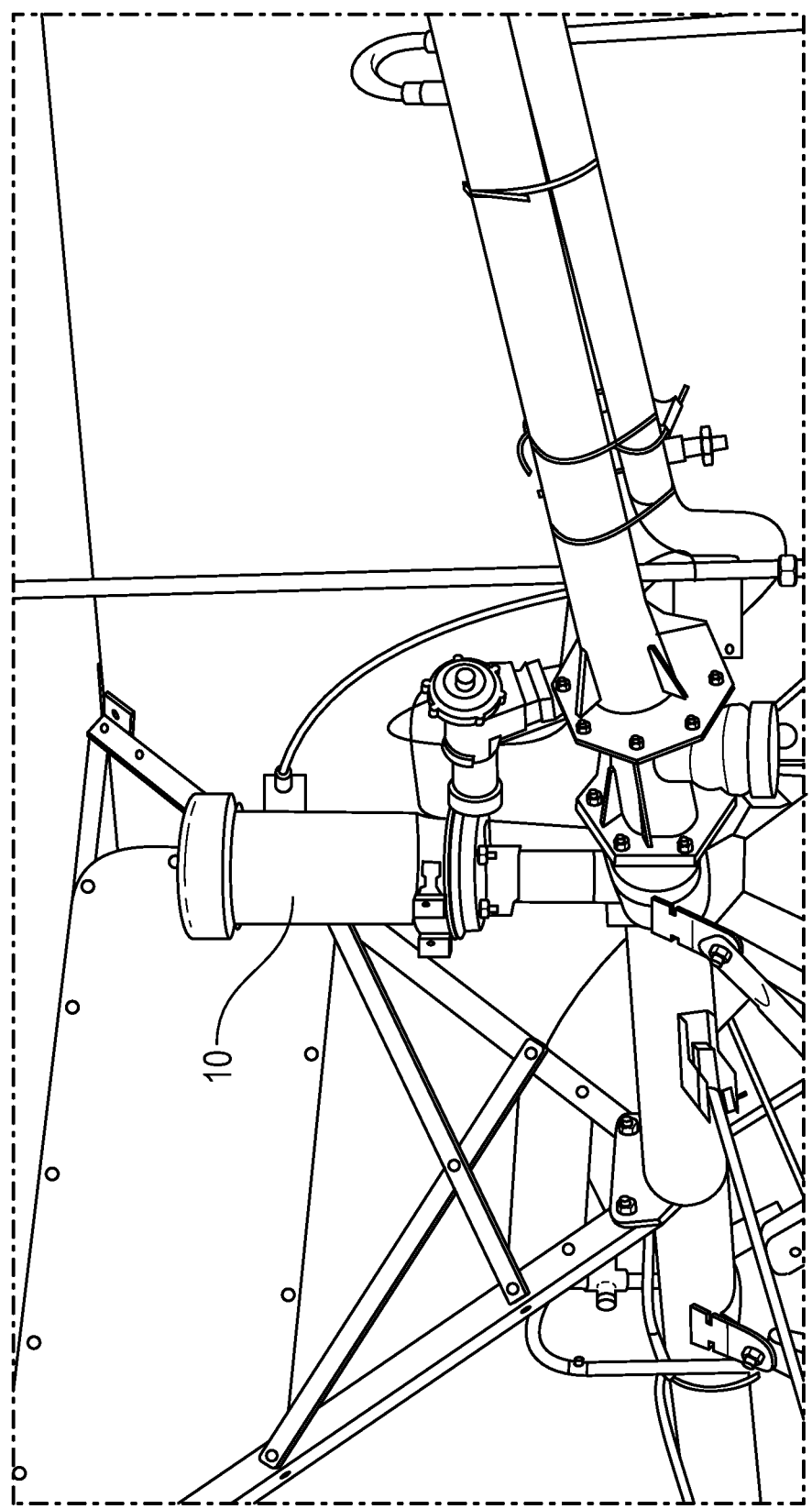
FIG. 10 is a perspective view of a portion of air compressor instrumentation of another exemplary pivot of the predictive maintenance system of FIG. 1.

In aspects, the controller 200 may receive the generated electrical signal, from a sensor 102 monitoring a valve 902 (FIG. 9). The valve 902 is configured to provide water for irrigation. The sensor 102 may sense, for example, but is not limited to pressure transient data. The sensor 102 may sense the pressure transient data over time, and/or generate a resultant waveform over time. The controller 200 may determine whether the valve 902, or one or more components thereof, requires maintenance based on the electrical signal and determine when the valve 902 requires maintenance (e.g., valve operation issues that can lead to the valve sticking open or closed) based on the electrical signal. The determination may be performed by the machine learning model and/or by a classical algorithm. The controller 200 may provide an alert to the user of the determination that the valve 902 requires maintenance.

Although an irrigation system is used as an example, the disclosed systems and methods may be used advantageously in other environments, such as, but not limited to dust management in a mine, and/or irrigation of turf on a stadium be covered In one aspect of the present disclosure, the disclosed algorithms may be trained using supervised learning. Supervised learning is the machine learning task of learning a function that maps an input to an output based on example input-output pairs. The ML model infers a function from labeled training data consisting of a set of training examples. In supervised learning, each example is a pair including an input object (typically a vector) and a desired output value (also called the supervisory signal). A supervised learning algorithm analyzes the training data and produces an inferred function, which can be used for mapping new examples. In various embodiments, the algorithm ma correctly determine the class labels for unseen instances. This requires the learning algorithm to generalize from the training data to unseen situations in a "reasonable" way.

In various embodiments, the neural network may be trained using training data, which may include, for example, different soil conditions or different component characteristics (e.g., current, voltage, pressures, duty, etc.). The algorithm may analyze this training data and produce an inferred function that may allow the algorithm to identify component failures or changes in health, based on the generalizations the algorithm has developed from the training data. In various embodiments, training may include at least one of supervised training, unsupervised training, and/or reinforcement learning.

In some aspects, a user can initiate a training session while watching operation to simplify setup on each unique end gun and pivot combination since pressures and flows may differ. When the end gun is deemed to be operating normally, the user can open a training window which will then be used to calibrate or train the analytics for future anomaly detection. For instance, Linux®, which may run a Python® script, for example, can be utilized to effectuate prediction. In aspects, analytics may also be performed in the sensor using platforms such as Tensor Flow® lite.

In various embodiments, the neural network may include, for example, a three-layer temporal convolutional network with residual connections, where each layer may include three parallel convolutions, where the number of kernels and dilations increase from bottom to top, and where the number of convolutional filters increases from bottom to top. It is contemplated that a higher or lower number of layers may be used. It is contemplated that a higher or lower number of kernels and dilations may also be used.

In aspects, the disclosed monitoring systems can be a separate system that can be selectively attached or retrofit to an end gun, or in some aspects, the monitoring system can be built directly into an end gun.

Figure 19:
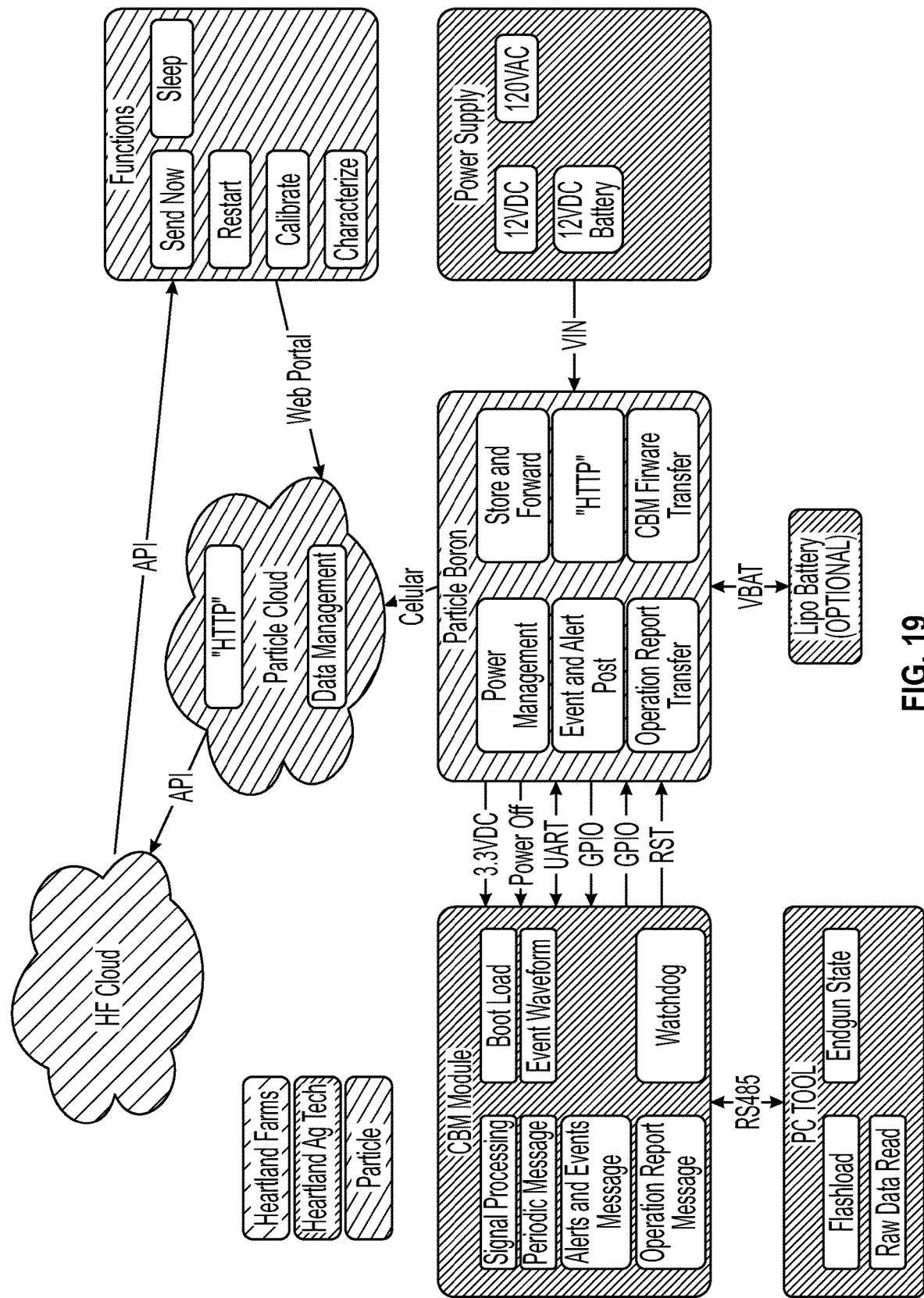
FIGS. 19-21 are high level block diagrams for a monitoring system in accordance with the disclosure.
Figure 20:
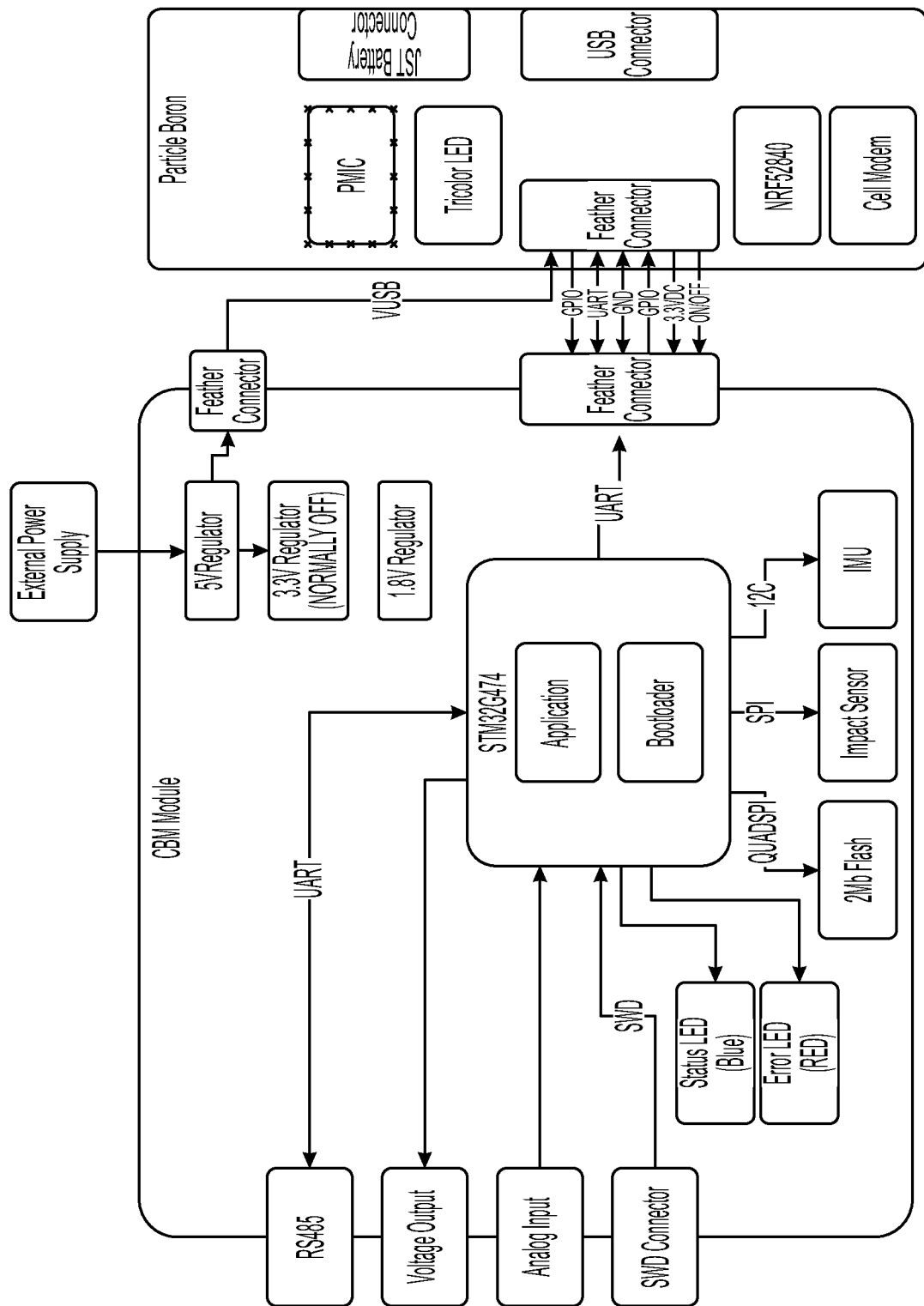
Figure 21:
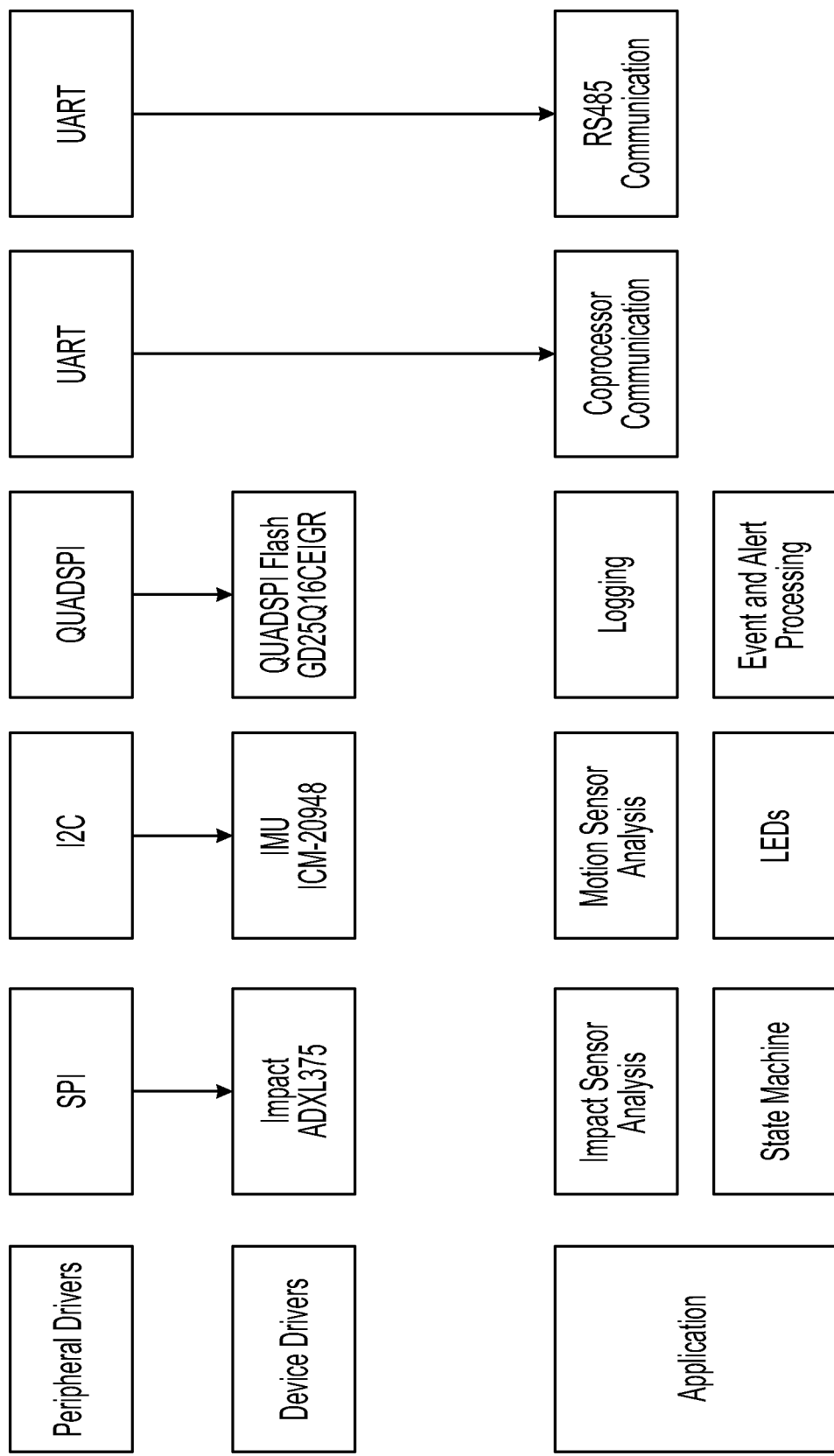

As seen in FIGS. 19-21, a condition-based monitoring (CBM) system in the form of an end gun testing system is also provided for testing end guns to determine health of end guns.

The system generally includes a first cloud server (e.g., a Heartland Farm cloud) which includes an interface for the system, a device cloud (e.g., a Particle cloud) configured for communication between connected devices and the system, and a firmware server, which is configured to push firmware updates to components of the system. System devices may include a cellular enabled microcontroller (e.g., a Particle Boron) and a CBM module. The cellular enabled microcontroller includes a cellular receiver/transmitter/, a wireless receiver/transmitter (e.g., Bluetooth and/or WIFI), power management functions, firmware update functions, watchdog functions, power management integrated circuits (PMIC), power on-self test (POST) functions, a universal asynchronous receiver/transmitter (UART), and a general purpose IO (GPIO). The cellular enabled microcontroller communicates with the condition-based monitor module (CBM module) which is configured for processing signals from sensors. The sensor signals can be sampled by the CBM module at a rate of 1125 KHz, for example. When the CBM module determines one or more operations are completed, the CBM module notifies the system via the cellular enabled microcontroller.

Referring to FIG. 20, a high-level block diagram of the CBM module is shown. The CBM module performs functions including signal processing, sensor calibration, power management, end gun operational report, end gun health alerts, end gun characterization, watchdog, bootloader, and a state machine. The CBM module generally includes a microcontroller (e.g., an STM32 microcontroller), a regulator, one or more UARTs, analog and/or digital inputs and outputs, a programming header (e.g., SWD and/or JTAG), status LED (e.g., status LED blue, error LED red), flash memory, an impact sensor, an inertial measurement unit (IMU). The application firmware and a bootloader firmware run on the microcontroller. The CBM module may be powered via an external power supply and/or a battery. An IMU is an electronic device that measures and reports a body's specific force, angular rate, and sometimes the orientation of the body, using a combination of accelerometers, gyroscopes, and/or magnetometers.

The signal processing functions include, for example, logic to: detect when the end gun starts and/or stops, determine the number of degrees (both forward and reverse degrees) the end gun has traveled based on an onboard compass, detect the average peak forward and/or reverse angular rate based on an onboard gyro, determine the average forward and reverse time, determine a forward to reverse time ratio, determine the time to trip the reversing lever for the end gun (for example, to notify the system if the unit is getting hung up and is taking too long to reverse direction), drive arm forward and/or reverse frequency based on the accelerometer and/or the gyro.

In aspects, a triangulated cellular location of the CBM module may be used to determine the end gun geolocation, speed, positioning, minimum and maximum observed location, and other relevant information. Cellular location data comes from a variety of sources, including cellphone towers, Global Positioning System (GPS) signals, and Bluetooth beacons. For example, the cellular location of the CBM module may be determined using cell site location information since the cellular devices connect their users to telecommunications and internet networks through cell towers with known locations.

The CBM module may generate an operational report based on the processed sensor signals and can upload the report to the system via the cellular enabled microcontroller. The operational report may include, for example, the total degrees traveled, the number of passes, average pass degrees traveled, and/or an average drive arm period.

Referring to FIG. 21, a diagram of the firmware is shown. The firmware may include, for example, the peripheral drivers (e.g., SPI, I2C, UART, and/or QUADSPI), the device drivers, and the application(s).

Figure 22:
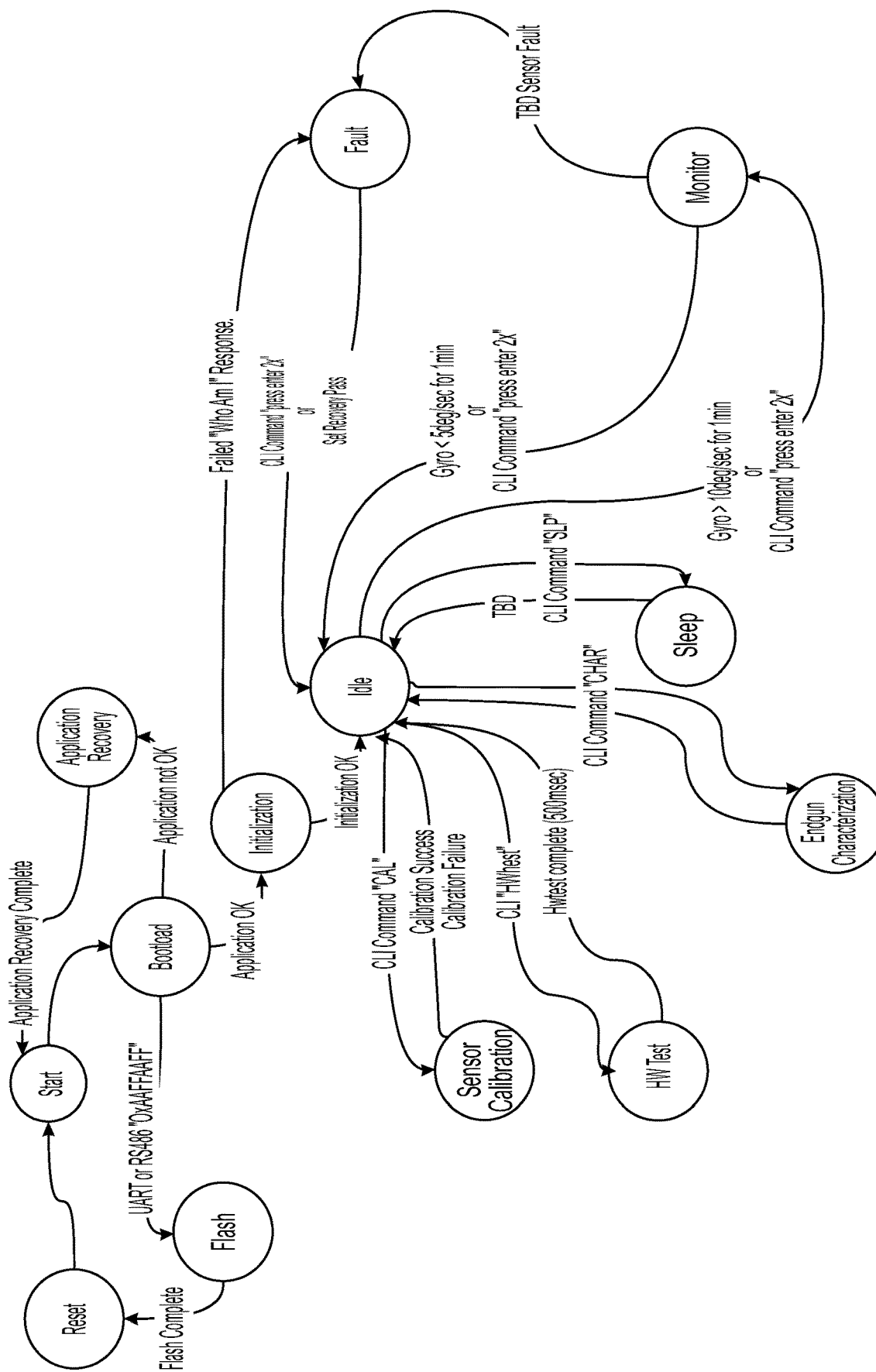
FIG. 22 is a state machine diagram for the system of FIG. 27 in accordance with the disclosure.

Referring to FIG. 22, a state machine for the CBM system is shown. A state machine is a behavioral model including a finite number of states. Based on the current state and a given input, the state machine performs state transitions. The state machine can include at least the following states: start (e.g., power on), boot load, initialization, application recovery, idle, monitor, sensor calibration, end gun characterization, fault, hardware test, monitor, and/or sleep.

When the CBM module is initially powered up, the state machine starts in the start state. Next, the CBM module enters the bootload state. In the bootload state, the bootloader firmware loads the application firmware into the working memory. The bootloader firmware may include the ability to update the firmware, determine if the application is ok or not (e.g., corrupt and/or wrong application), or load the application firmware. The bootloader firmware may determine if the application firmware is compatible with the hardware.

When in the bootload state, if the CBM module receives a predetermined command (e.g., 0xAAFFAAFF"), the CBM module may enter a flash state (e.g., a firmware update mode). In this state, the CBM module can receive firmware updates and then reset after updating the application firmware.

If the application firmware is ok (e.g., not corrupt and/or wrong application), and a flash command is not received, then the application firmware is loaded and the initialization state is entered. In the initialization state, the CBM module sets up the sensors and communicates with the memory.

If initialization is ok, Idle state begins. In the Idle state, generally the CBM module reads sensor data and processes the sensor data to generate the operational report. While in the idle state, the CBM module may poll/interrogate the IMU to get the latest heading and/or temperature from the device. In the idle state, if the gyro is active for more than about 10 degrees per second, for about one minute, for instance, the CBM module enters the monitor state, where the various sensors are monitored.

While in the monitor state, if the gyro (e.g., the z-axis gyro) is less than about 5 degrees/second for about a minute, for instance, the CBM module exits the monitor state and re-enters the idle state. Upon transition to the monitor state, the CBM module will issue the end gun start event. Upon exit of the monitor state, the CBM module will issue the end gun stop event. Upon exit of the monitor state, the CBM module may send the operational report to the first cloud server. In the monitor state, the CBM module may determine, based on the sensors, that one or more of the end guns have failed and may report the failure to the first cloud server.

The CBM module may include a command line interface (CLI), which enables a user computing device (e.g., a mobile device, a tablet, a desktop computer, and/or a laptop) connected to the CBM module via the UART (e.g., by RS485 and/or Bluetooth) to send commands to the CBM module to enter various states from the idle state. For example, a CLI command "CAL" causes the CBM module to enter the sensor calibration state. In a sensor calibration state, the system may allow for the calibration of the sensors and sensor data. Additionally, if a TBS sensor fault is detected during the monitor state, the CBM module may enter a self-recovery pass and re-enter the idle state. Faults may be based on a total number of degrees traveled by the end gun, a number of passes, an average pass degree traveled, an average drive arm period, an average peak gyro output per drive arm impact, an average peak accelerometer magnitude per drive arm impact, an average forward and reverse time ratio, a total time in end gun on state, a number of faults reported during operation, a triangulated cellular location, a minimum heading, and/or a maximum heading. For example, a CLI command "HWtest" causes the CBM module to enter the hardware test state. In the hardware test state, the CBM module tests the attached hardware. For example, a CLI command "press enter twice" causes the CBM module to enter the monitor state. For example, a CLI command "CHAR" causes the CBM module to enter the end gun characterization state. In the end gun characterization state, the CBM module enables characterizing and scoring of the characterization of the attached hardware. For example, a CLI command "SLP" causes the CBM module to enter the sleep state.

Figure 23:
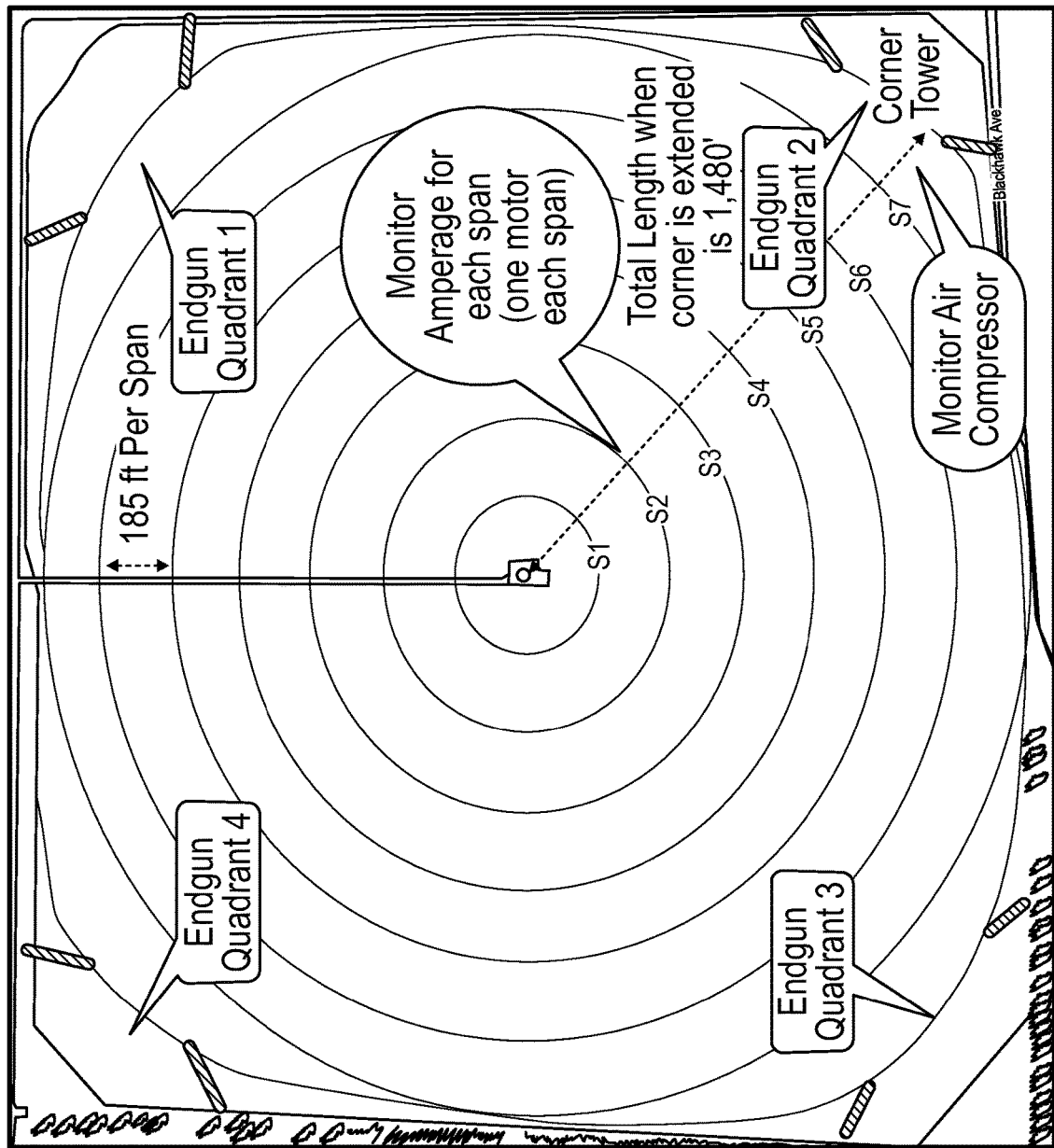
FIG. 23 is a diagram of end gun quadrants in a field being utilized for determining irrigation failure locations, in accordance with the disclosure.

FIG. 23 is a diagram of end gun zones (e.g., four quadrants) utilized for determining irrigation failure location. In aspects, one or more end guns may be located in the four quadrants of a field that also uses a center pivot irrigation system. Even though four quadrants are used as an example, any number of end gun zones are contemplated to be within the scope of this disclosure. The end gun may be used to irrigate the corners (e.g., quadrants) of a field that are missed by the center pivot irrigation system. Center pivot irrigation systems often take as long as two full days to make a full circle around the field. If there is an equipment failure and the user does not notice that a corner is not irrigated on a hot summer day, for example, the crops in that corner may die. Accordingly, the methods and systems for real-time missed corner detection of the disclosure help to avoid those situations by detecting a corner (e.g., quadrant) that was not irrigated and reporting this to the user. In addition to not being irrigated, sometimes the end gun 70 sticks "on" when it should be "off," which can lead to hazards for homes and motorists in the area. In aspects, each quadrant may include two end guns equipped with a CBM module, for example. The CBM module may include a compass (e.g., a magnetometer) configured to determine a minimum and a maximum observed heading of the two end guns (e.g., a first end gun and a second end gun). For example, if the first end gun has a minimum observed heading of southwest and the second end gun has a maximum observed heading of northeast, then the controller 200 may determine that the first and the second end gun are located in quadrant 4. The first end gun for a quadrant may have a relationship to the first end gun for the next or previous quadrant, where they are offset in orientation by about 90 degrees. For example, the first end gun of quadrant 4 may have a minimum observable position of southwest and the first end gun of quadrant 1 may have a minimum observable position of northwest. In aspects, the CBM module may include a GPS, and/or use cellular location triangulation to set up a geofence to determine which quadrant an end gun is located in. For example, based on the GPS coordinates, the controller 200 may determine that an end gun is in quadrant 2. The method may monitor for trigger "on" events to determine if an end gun has been triggered to irrigate the field. The controller 200 may determine, based on the quadrant and whether a trigger on event was detected, that the determined quadrant was not irrigated. In aspects, the user may receive a report or an indication (e.g., a text message, email, etc.) that the determined quadrant was not irrigated. For example, the controller 200 may detect a trigger on event for an end gun. The controller 200 also may detect that that specific end gun was located in quadrant 1. The controller 200 would determine that quadrant 1 was irrigated. Next, the controller 200 may detect for the next end gun that there was no trigger on event, and based on the end gun's GPS location it was in quadrant 2. The controller 200 would determine that quadrant 2 may not have been irrigated and would generate a report to alert the user so that the user can check out that end gun for possible equipment failure. In the end gun zones, for example, the end gun 70 may be turned "on" in a random location around the 360 degrees, not operated in another corner, and/or in some cases, turned "on" all the time.

It is contemplated that the movable end gun may be operatively coupled with the pivot, e.g., as part of the system, but separate from the pivot. For example, in some less capitalized farms, a pivot may not have an end gun, but rather the end gun may be placed in a fixed location in the corner of the field. The end gun may include stationary gun style sprinklers that are set into place on a tripod or quadpod.

Figure 24:
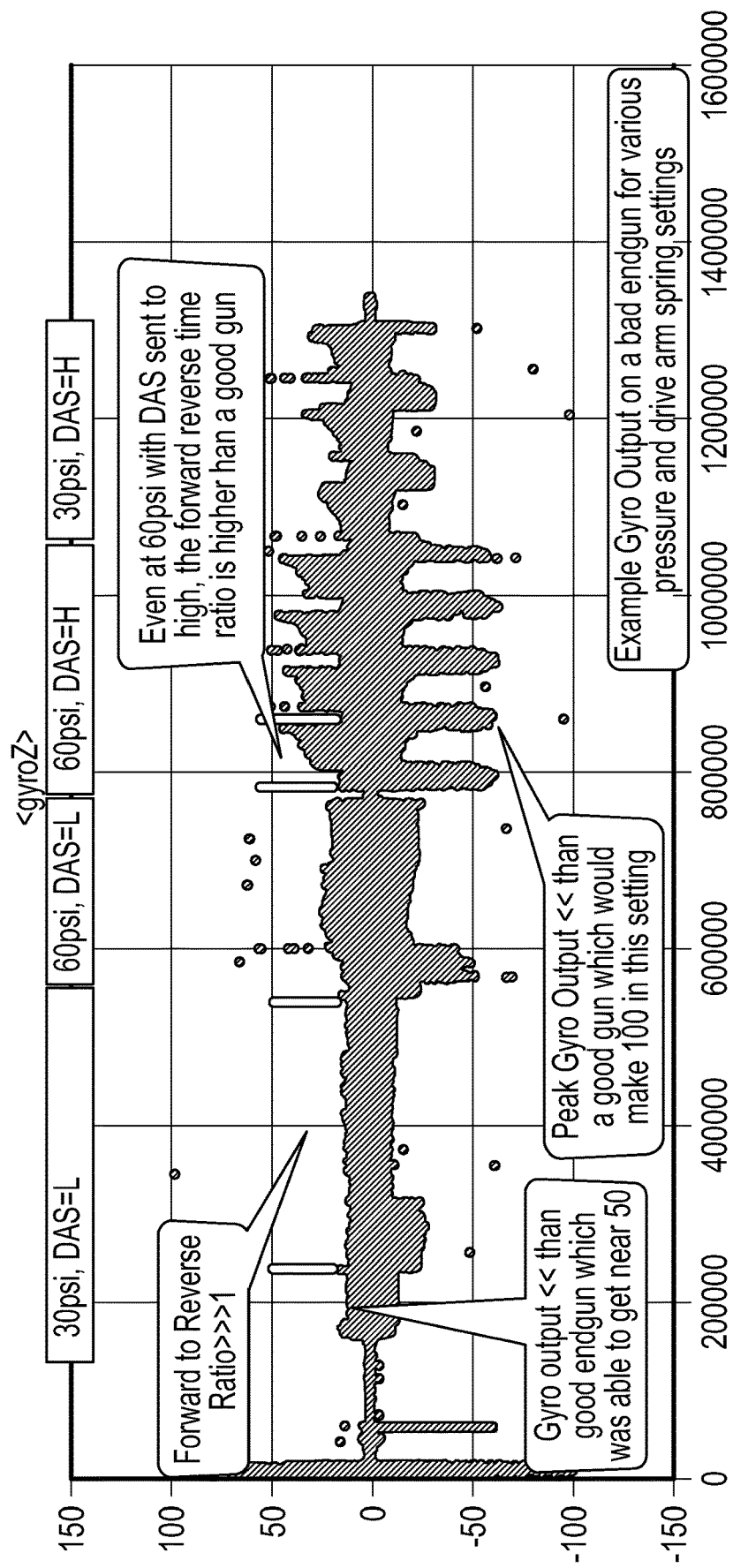
FIG. 24 is a graph of example gyro signal output for the monitoring system of FIG. 1, in accordance with the disclosure.

Referring to FIG. 24, a graph of example gyro signal output for the monitoring system of FIG. 1, is shown. For example, if an end gun requires maintenance, data from the gyro may provide indications such as the forward/reverse time ratio being higher than for an end gun that does not require maintenance.

Figure 25:
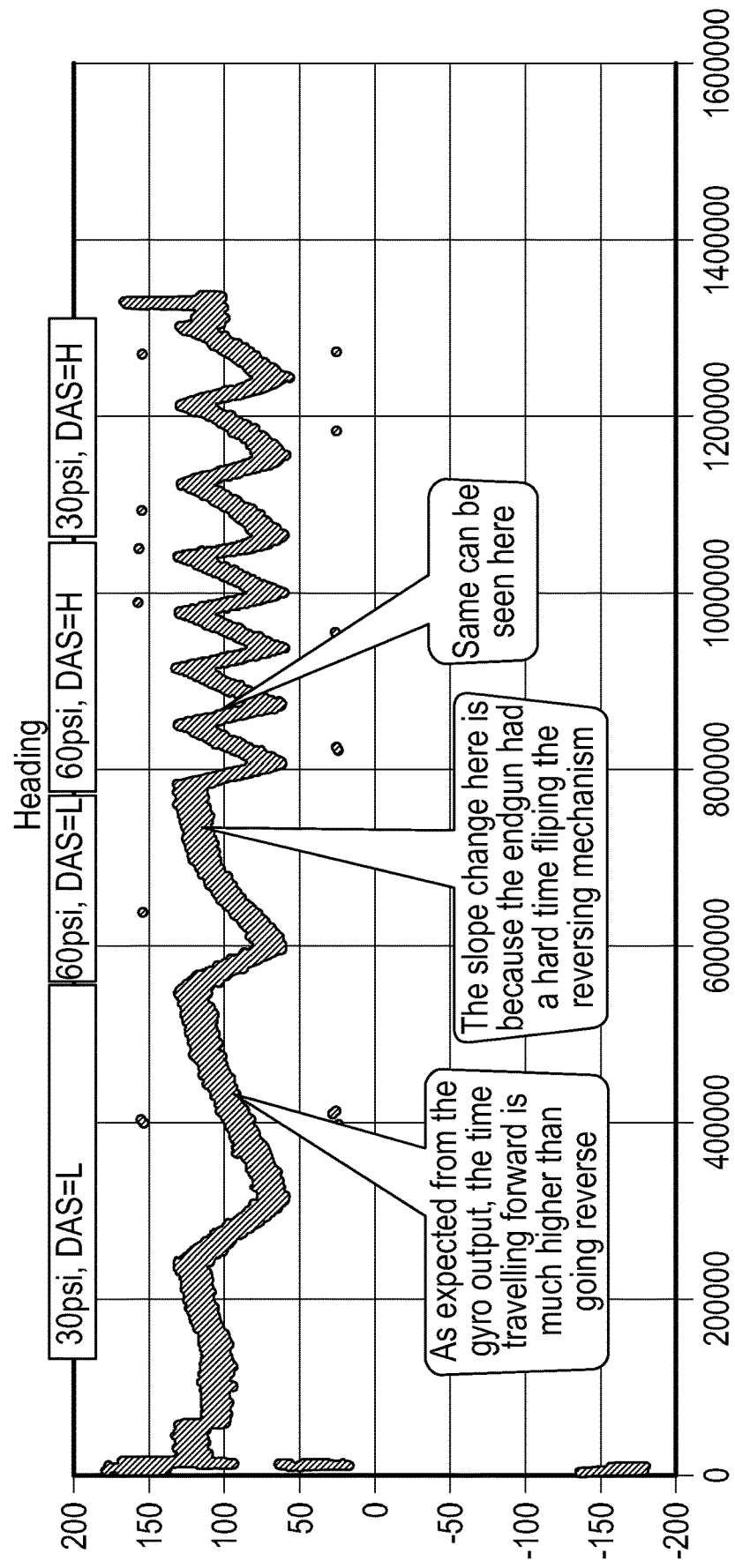
FIG. 25 is a graph of example compass signal output for the monitoring system of FIG. 1, in accordance with the disclosure.

Referring to FIG. 25 a graph of example compass signal output for the monitoring system of FIG. 1, is shown. For example, if the end gun has a hard time flipping a reversing mechanism, there may be a slope change in the output data from the compass (i.e., the magnetometer).

Figure 26:
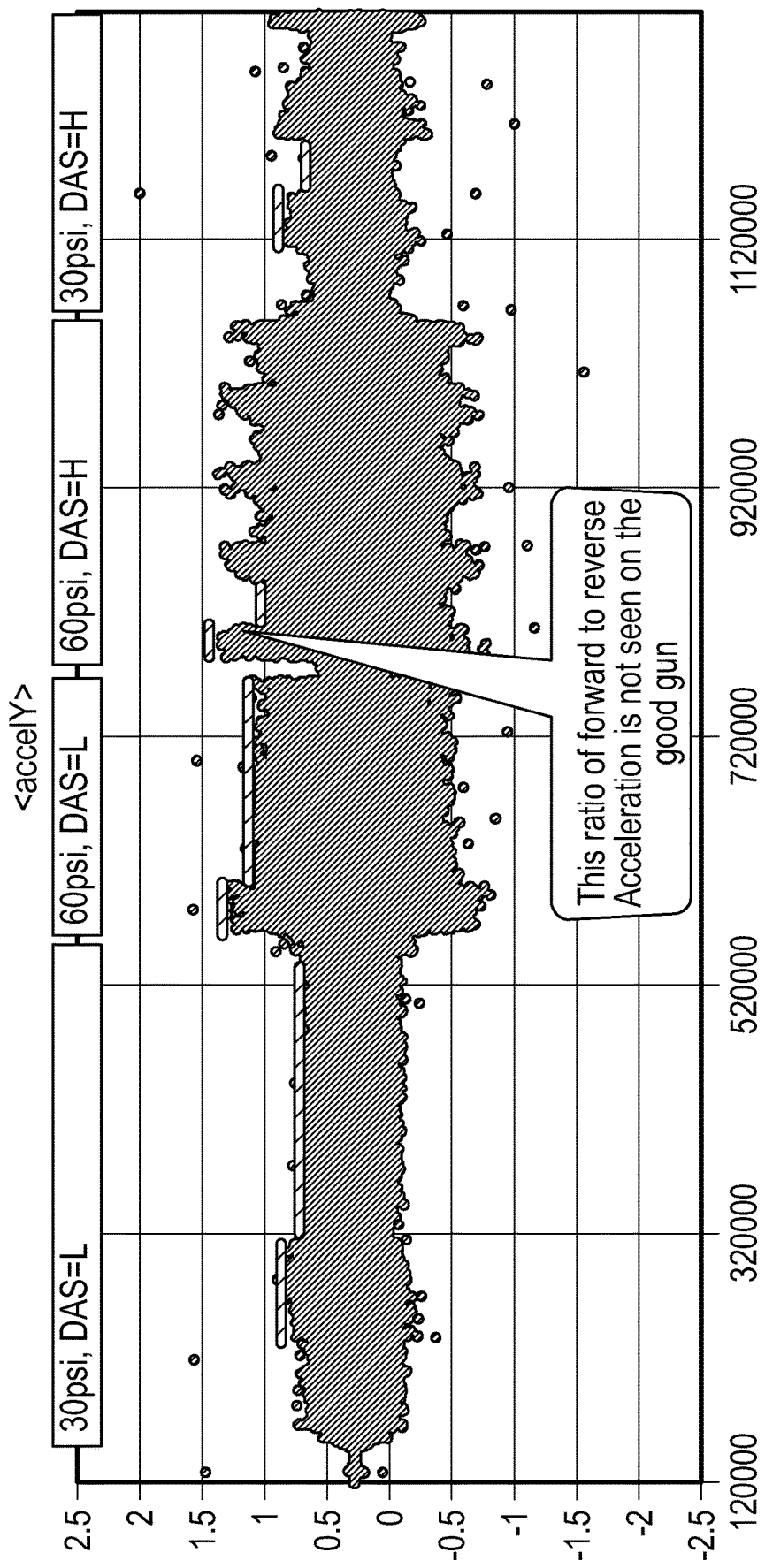
FIG. 26 is a graph of example accelerometer signal output for the monitoring system of FIG. 1, in accordance with the disclosure.

Referring to FIG. 26 a graph of example accelerometer signal output for the monitoring system of FIG. 1, is shown. For example, if an end gun requires maintenance, data from the accelerometer may provide indications such as the forward reverse time ratio being higher than for an end gun that does not require maintenance.

As can be appreciated, securement of any of the components of the disclosed apparatus can be effectuated using known securement techniques such welding, crimping, gluing, fastening, etc.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A monitoring system for an irrigation system including a movable end gun having a first trigger state and a second trigger state that is different from the first trigger state, the moveable end gun including an elongated shaft defining a longitudinal axis and pivotably coupled to a span of the irrigation system to enable the elongated shaft to pivot relative to the span about a transverse axis extending through the elongated shaft, the movable end gun further including an end gun nozzle disposed at an end portion of the elongated shaft, the monitoring system comprising:
   a sensor operably associated with the movable end gun and configured to generate an electrical signal indicative of movement and/or positioning of the movable end gun relative to a portion of the irrigation system, wherein the sensor includes at least one of an encoder, a flow meter, a magnetometer, a gyroscope, an accelerometer, a gesture sensor, a microphone, a laser range finder, a reed switch, a magnetic switch, a GPS, or an optical switch;
   a processor; and
   a memory, including instructions stored thereon, which when executed by the processor cause the monitoring system to:
      receive the electrical signal;
      provide the electrical signal as an input to a machine learning model; and
      based on the electrical signal, determine by the machine learning model when the movable end gun is in the first trigger state and/or the second trigger state,
   wherein the first trigger state includes at least one of an on state, a fault state, or a functional state, and
   wherein the second trigger state includes at least one of an off state, a no-fault state, or a non-functional state.

2. The monitoring system of claim 1, further comprising:
   a pressure sensor configured to couple to the movable end gun and generate a second electrical signal indicative of fluid pressure dispensed from the movable end gun,
   wherein the instructions, when executed, further cause the monitoring system to:
      determine a fluid pressure based on the second electrical signal;
      determine an angular rate of the movable end gun and time spent going forward and/or reverse based on the electrical signal; and
      determine a uniformity of irrigation based on the determined angular rate.

3. The monitoring system of claim 2, wherein the instructions, when executed, further cause the monitoring system to generate a report based on the determinations.

4. The monitoring system of claim 2, wherein the instructions, when executed, further cause the monitoring system to:
   determine if the end gun pivots more than a predetermined number of degrees without an end gun on trigger state; and
   provide an indication to a user that a location was not irrigated based on the determination.

5. The monitoring system of claim 1, wherein the portion of the irrigation system includes at least one of a lateral drive, a water winch, or a pivot, and wherein the movable end gun is movably mounted on the pivot.

6. The monitoring system of claim 1, wherein the movable end gun is part of the same system but separate from the portion of the irrigation system.

7. The monitoring system of claim 1, further comprising an analytics engine configured to perform the determinations.

8. The monitoring system of claim 6, wherein the machine learning model is based on a deep learning network, a classical machine learning model, or combinations thereof.

9. The monitoring system of claim 1, wherein the sensor includes a camera.

10. The monitoring system of claim 1, wherein the sensor is configured to be disposed on the moveable end gun.

11. The monitoring system of claim 1, wherein the rotation of the endgun is independent of the rotation of the irrigation system.

12. The monitoring system of claim 1, wherein the irrigation system is a circular irrigation system.

13. A monitoring system for an irrigation system including a movable end gun having a plurality of trigger states, the monitoring system comprising:
   a sensor operably associated with the movable end gun and configured to generate an electrical signal indicative of movement and/or positioning of the movable end gun relative to a portion of the irrigation system, the moveable end gun rotatably coupled to a span of the irrigation system, the movable end gun including an elongated shaft and an end gun nozzle disposed at an end portion of the elongated shaft, the elongated shaft defining a longitudinal axis and a pivot axis that is transverse to the longitudinal axis, the elongated shaft rotatable about the pivot axis to enable the elongated shaft to rotate relative to the span, wherein the sensor includes at least one of an encoder, a flow meter, a magnetometer, a gyroscope, an accelerometer, a gesture sensor, a microphone, a laser range finder, a reed switch, a magnetic switch, a GPS, or an optical switch;
   a processor; and
   a memory, including instructions stored thereon, which when executed by the processor cause the monitoring system to:
      receive the electrical signal;
      provide the electrical signal as an input to a machine learning model;
      predict by the machine learning model, at least one trigger state of the plurality of trigger states of the movable end gun based on the electrical signal; and determine when the movable end gun pivots more than a predetermined number of degrees when the movable end gun is in at least one of the plurality of trigger states; and selectively provide an indication of an amount of irrigation of a predetermined based on the determination.

14. The monitoring system of claim 13, wherein the plurality of trigger states include at least one of an on state or an off state.

15. The monitoring system of claim 13, further comprising:

a pressure sensor configured to couple to the movable end gun and generate a second electrical signal indicative of fluid pressure dispensed from the movable end gun, wherein the instructions, when executed, further cause the monitoring system to:

determine a fluid pressure based on the second electrical signal;

determine an angular rate of the movable end gun and time spent going forward and/or reverse based on the electrical signal; and determine a uniformity of irrigation based on the determined angular rate.

16. The monitoring system of claim 15, wherein the instructions, when executed, further cause the monitoring system to generate a report based on the determinations.

17. The monitoring system of claim 15, wherein the instructions, when executed, further cause the monitoring system to:

determine if the end gun pivots more than a predetermined number of degrees without an end gun on trigger state; and provide an indication to a user that a location was not irrigated based on the determination.

18. The monitoring system of claim 13, wherein the portion of the irrigation system includes at least one of a lateral drive, a water winch, or a pivot, and wherein the movable end gun is movably mounted on the pivot.

19. The monitoring system of claim 13, wherein the movable end gun is part of the same system but separate from the portion of the irrigation system.

20. The monitoring system of claim 13, further comprising an analytics engine configured to perform the determinations.

21. The monitoring system of claim 20, wherein the analytics engine includes a machine learning model, and wherein the machine learning model is based on a deep learning network, a classical machine learning model, or combinations thereof.

22. A monitoring system for an irrigation system including a movable end gun, the monitoring system comprising:

a sensor operably associated with the movable end gun, and configured to generate an electrical signal indicative of movement and/or positioning of the movable end gun relative to the irrigation system, the moveable end gun including an elongated shaft and an end gun nozzle disposed at first end portion of the elongated shaft, the elongated shaft being rotatable about a pivot axis defined transversely through a second end portion of the elongated shaft that is opposite to the first end portion to enable the elongated shaft to rotate relative to a span of the irrigation system, wherein the sensor includes at least one of an encoder, a flow meter, a magnetometer, a gyroscope, an accelerometer, a gesture sensor, a microphone, a laser range finder, a reed switch, a magnetic switch, a GPS, or an optical switch;

a processor; and a memory, including instructions stored thereon, which when executed by the processor cause the monitoring system to:

receive the electrical signal;

provide the electrical signal as an input to a machine learning model;

based on the electrical signal, determine by the machine learning model, a rate of angular movement of the movable end gun, a duration of movement of the movable end gun in at least one direction, and a trigger state of the movable end gun; and predict, by the machine learning model, an amount of irrigation of a predetermined location based on the determination, wherein the trigger state includes at least one of an on state, a fault state, or a functional state.

* * * * *